(12) United States Patent
Pedersen

(10) Patent No.: US 12,546,426 B2
(45) Date of Patent: Feb. 10, 2026

(54) SYSTEMS AND METHODS FOR CONVEYING GAS AND CONNECTION ASSEMBLIES FOR THE SAME

(71) Applicant: The Boeing Company, Arlington, VA (US)

(72) Inventor: Aaron J. Pedersen, Summerville, SC (US)

(73) Assignee: The Boeing Company, Arlington, VA (US)

( * ) Notice: Subject to any disclaimer, the term of this patent is extended or adjusted under 35 U.S.C. 154(b) by 54 days.

(21) Appl. No.: 18/617,893

(22) Filed: Mar. 27, 2024

(65) Prior Publication Data

US 2025/0305612 A1    Oct. 2, 2025

(51) Int. Cl.
*F16L 37/18*        (2006.01)
*F16L 37/248*       (2006.01)

(52) U.S. Cl.
CPC ............. *F16L 37/18* (2013.01); *F16L 37/248* (2013.01)

(58) Field of Classification Search
CPC ..... F16L 37/107; F16L 37/113; F16L 37/248; F16L 37/352; F16L 37/18
See application file for complete search history.

(56) References Cited

U.S. PATENT DOCUMENTS

| | | | |
|---|---|---|---|
| 437,915 A | 10/1890 | Costigan | |
| 4,648,630 A | 3/1987 | Bruch | |
| 6,350,139 B1 | 2/2002 | Haag | |
| 6,447,027 B1 * | 9/2002 | Lilley | F16L 37/113 285/376 |
| 7,543,857 B2 | 6/2009 | Dole | |
| 8,132,649 B2 | 3/2012 | Rogers | |
| 9,695,968 B1 | 7/2017 | Hartman et al. | |
| 9,732,894 B1 | 8/2017 | Hartman et al. | |
| 11,135,538 B2 | 10/2021 | Niakan et al. | |
| 11,169,350 B2 | 11/2021 | Coenegracht et al. | |
| 11,408,546 B2 | 8/2022 | Hartman et al. | |
| 11,415,248 B2 | 8/2022 | Berbiano et al. | |
| 2011/0315720 A1 | 12/2011 | Marshall et al. | |
| 2014/0261818 A1 * | 9/2014 | Cruickshank | F16L 37/248 285/330 |
| 2014/0284921 A1 * | 9/2014 | van der Valk | F16L 37/248 285/312 |
| 2015/0240977 A1 | 8/2015 | Zonneveld et al. | |
| 2019/0388819 A1 | 12/2019 | Niakan et al. | |
| 2021/0285586 A1 * | 9/2021 | Vinson | F16L 37/252 |
| 2022/0074530 A1 | 3/2022 | Hartman et al. | |
| 2024/0218952 A1 * | 7/2024 | Tamaoka | F16L 37/248 |

OTHER PUBLICATIONS

European Patent Office, Extended European Search Report, App. No. 25154075.3 (May 22, 2025).

* cited by examiner

*Primary Examiner* — Zachary T Dragicevich
(74) *Attorney, Agent, or Firm* — Walters & Wasylyna LLC

(57) ABSTRACT

A fitting includes a fitting body having a connection axis. The fitting includes a fitting first end having a fitting first opening. The fitting includes a fitting second end having a fitting second opening. The fitting includes a fitting cam-lock proximate the fitting first end. The fitting includes a fitting twist-lock proximate the fitting second end. The fitting cam-lock is configured to engage a manifold cam-lock of a manifold of a gas conveyance system. The fitting twist-lock is configured to engage a connector twist-lock of a connector by rotating the connector about the connection axis relative to the fitting.

20 Claims, 18 Drawing Sheets

SYSTEMS AND METHODS FOR CONVEYING GAS AND CONNECTION ASSEMBLIES FOR THE SAME

FIELD

The present disclosure relates generally to gas transfer and, more particularly, to systems and methods for conveying gas and fittings and connectors used with such systems and methods.

BACKGROUND

During the manufacture of large structures, such as aircraft, certain manufacturing operations must be performed manually within relatively small or confined spaces, which can lead to air-quality issues within the space. To resolve the problem with air quality, hoses can be positioned to supply fresh, breathable air to the space. However, these hoses must be removed and/or repositioned each time a mechanic moves between different spaces or when a new structure moves into production. Due to the need to regularly remove, reposition, and reconnect the hoses, the hoses are often temporarily connected to air handlers and/or air distribution manifolds using tape, zip ties, and the like. Such makeshift or improvised connections are time consuming to complete and do not provide an effective seal between sections of the air conveying system. Accordingly, those skilled in the art continue with research and development efforts in the field of gas conveyance during manufacturing and, more particularly, in the air quality during manufacturing.

SUMMARY

Disclosed are examples of a fitting, a connection assembly, a gas conveyance system, and a method for conveying a gas. The following is a non-exhaustive list of examples, which may or may not be claimed, of the subject matter according to the present disclosure.

In an example, the disclosed fitting includes a fitting body having a connection axis. The fitting includes a fitting first end having a fitting first opening. The fitting includes a fitting second end having a fitting second opening. The fitting includes a fitting cam-lock proximate the fitting first end. The fitting includes a fitting twist-lock proximate the fitting second end. The fitting cam-lock is configured to engage a manifold cam-lock of a manifold of a gas conveyance system. The fitting twist-lock is configured to engage a connector twist-lock of a connector by rotating the connector about the connection axis relative to the fitting.

In an example, the disclosed connection assembly includes a fitting configured connect to a manifold. The fitting includes a fitting cam-lock and a fitting twist-lock. The connection assembly includes a connector configured to connect to a hose. The connector includes a connector twist-lock. The fitting cam-lock of the fitting is configured to engage a manifold cam-lock of the manifold. The fitting twist-lock of the fitting is configured to engage the connector twist-lock of the connector by rotating the connector about a connection axis relative to the fitting.

In an example, the system includes a manifold including a manifold cam-lock. The system includes a hose. The system includes a fitting connected to the manifold. The fitting includes a fitting cam-lock and a fitting twist-lock. The system includes a connector connected to the hose. The connector includes a connector twist-lock. The fitting cam-lock of the fitting is configured to engage the manifold cam-lock of the manifold. The fitting twist-lock of the fitting is configured to engage the connector twist-lock of the connector by rotating the connector about a connection axis relative to the fitting.

In an example, the disclosed method includes steps of: (1) coupling an intake hose to an air source; (2) coupling the intake hose to a manifold using an intake connection assembly; (3) coupling an output hose to the manifold using an output connection assembly; and (4) running the output hose to a confined space. Each one of the intake connection assembly and the output connection assembly includes a fitting. The fitting is connected to the manifold. The fitting includes a fitting cam-lock and a fitting twist-lock. Each one of the intake connection assembly and the output connection assembly includes a connector. The connector is connected to the intake hose or the output hose. The connector includes a connector twist-lock. The fitting cam-lock of the fitting is configured to engage a manifold cam-lock of the manifold. The fitting twist-lock of the fitting is configured to engage the connector twist-lock of the connector by rotating the connector about a connection axis relative to the fitting.

Other examples of the fitting, the connection assembly, the system, and the method will become apparent from the following detailed description, the accompanying drawings, and the appended claims.

DETAILED DESCRIPTION

Referring generally to FIGS. 1-22, by way of examples, the present disclosure is directed to a gas conveyance system 200 and a method 1000 for conveying, transferring, or otherwise handling gas, such as air. In one or more examples, the system 200 and/or the method 1000 can be used to distribute, deliver, or disperse gas, such as fresh, breathable air, to a desired space, such as a confined space. In one or more examples, the system 200 and/or method 1000 can be used to collect, remove, or gather gas, such as contaminated air and/or undesirable fumes, from a desired space, such as a confined space. By way of examples, the present disclosure is also directed to a fitting 102 and a connection assembly 100 used with the system 200, for example, to couple and decouple sections of the system 200, and/or used to implement the method 1000.

Examples of the fitting 102, the connection assembly 100, and the system 200 solve the problem related to air quality within confined spaces during production operations. The connection assembly 100 enables different sections of the system 200 to be efficiently and effectively coupled together for distribution of fresh, breathable air to a space 280 (e.g., a confined space) or removal of contaminated air from the space 280 and then quickly and easily decoupled and recoupled, as desired. While the examples of the connection assembly 100 are described herein with respect to an air-handling system for distribution and/or removal of air within a confined space, the connection assembly 100 can be used with any suitable type of gas conveying system that includes multiple sections that are regularly coupled and decoupled during use.

Figure 1:
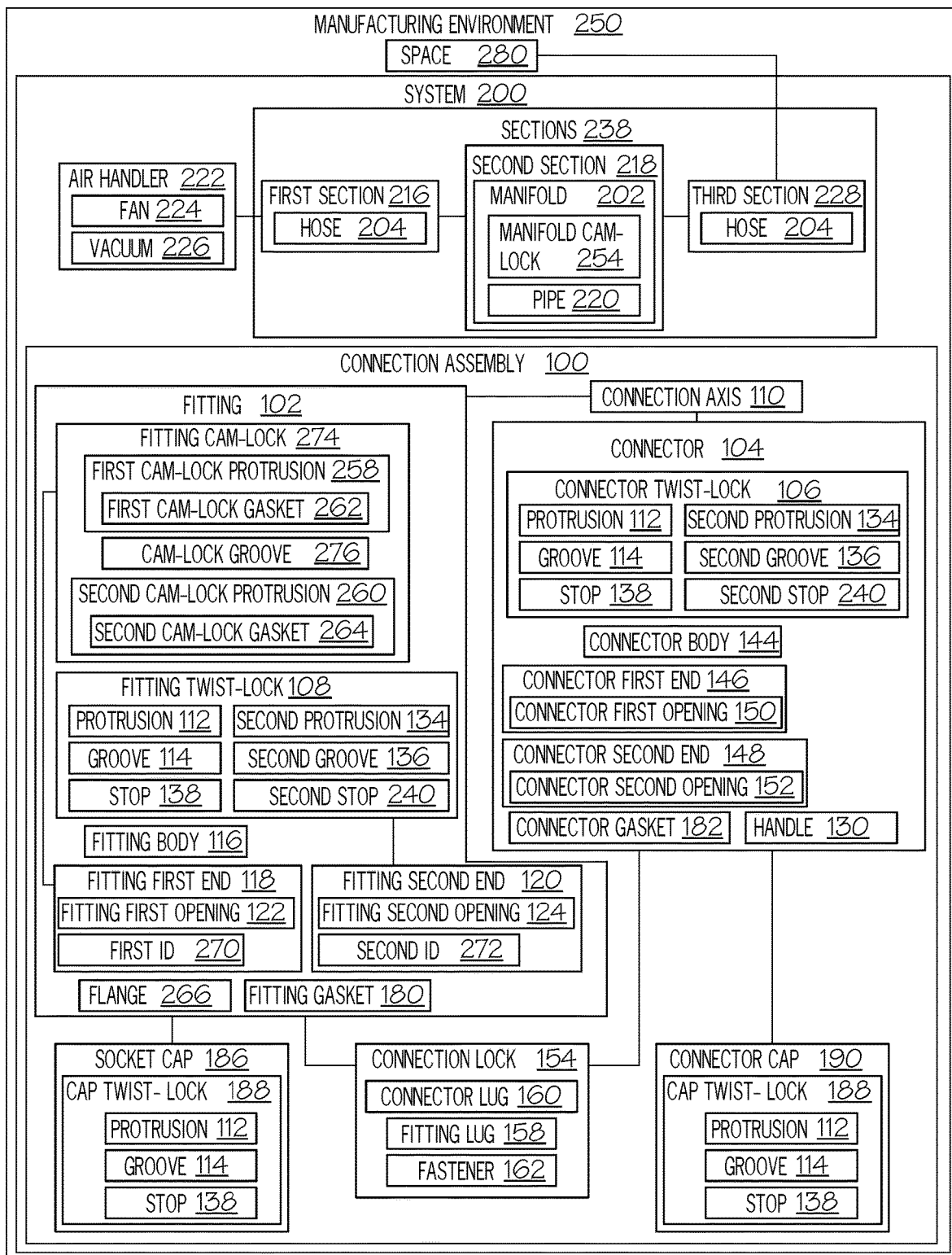
FIG. 1 is a schematic block diagram of a gas conveyance system.
Figure 3:
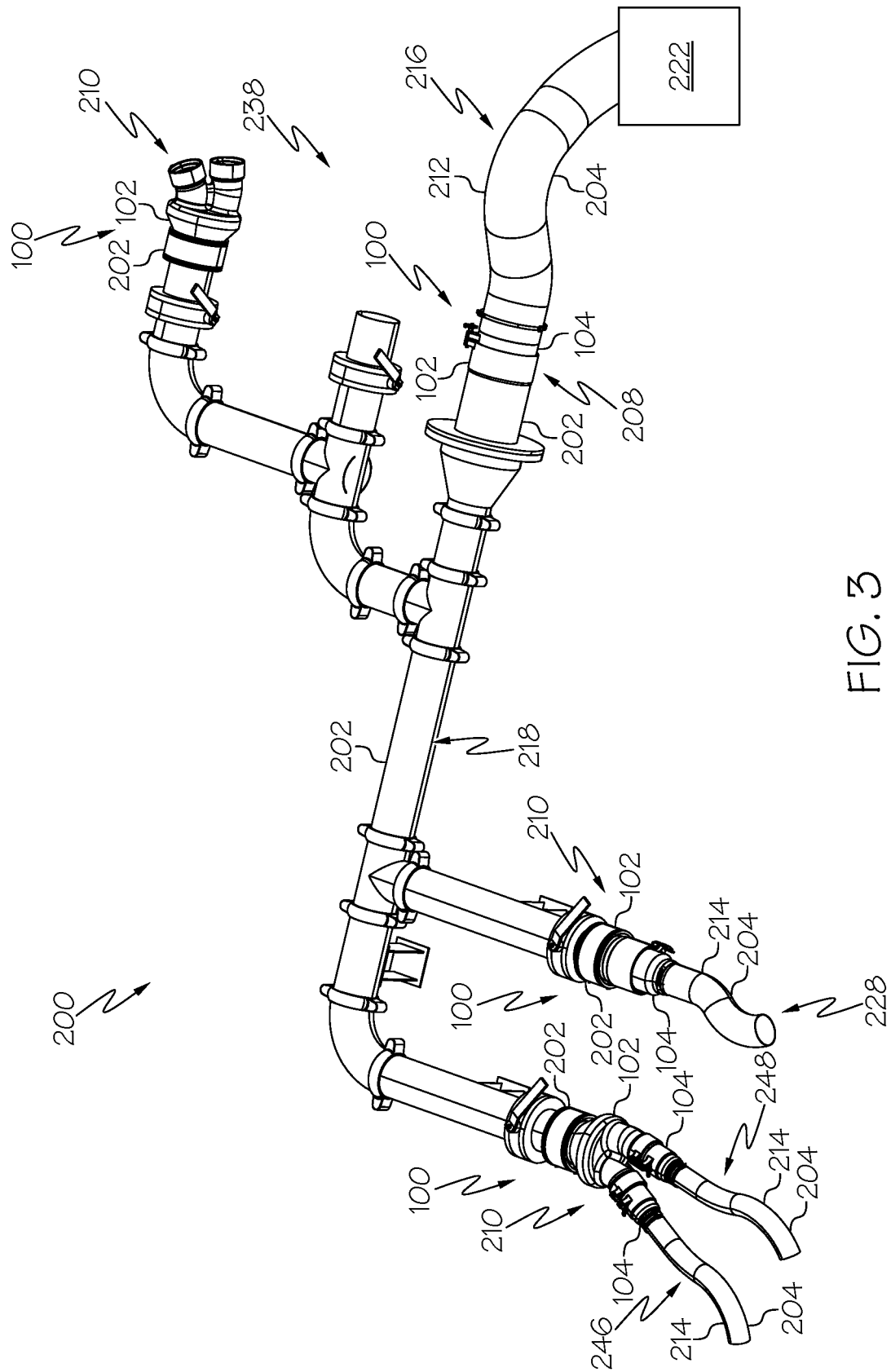
FIG. 3 is a schematic, perspective view of an example of the gas conveyance system.

Referring now to FIGS. 1 and 3, the following are examples of the gas conveyance system 200, according to the present disclosure. The system 200 includes a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Referring to FIG. 1, as will be described in more detail herein, in various examples, the system 200 includes a number of components, including one or more of an air handler 222, a plurality of sections 238, a first section 216, a second section 218, a third section 228, a hose 204, a manifold 202, a manifold cam-lock 254, a pipe 220, a fan 224, a vacuum 226, a connection assembly 100, a fitting 102, a connector 104, a fitting cam-lock 274, a connector twist-lock 106, and a fitting twist-lock 108. The system 200 may be used in any suitable manufacturing environment 250.

Referring to FIGS. 1 and 3, in one or more examples, the system 200 includes the manifold 202 and the hose 204. The manifold 202 and the hose 204 are connected together using the fitting 102 and the connector 104 of the connection assembly 100. The manifold 202 includes the manifold cam-lock 254. The fitting 102 is connected to the manifold 202. The fitting 102 includes the fitting cam-lock 274 and the fitting twist-lock 108. The connector 104 is connected to the hose 204. The connector 104 includes the connector twist-lock 106. The fitting cam-lock 274 of the fitting 102 is configured to engage the manifold cam-lock 254 of the manifold 202. The fitting twist-lock 108 of the fitting 102 is configured to engage the connector twist-lock 106 of the connector 104 by rotating the connector 104 about a connection axis 110 relative to the fitting 102.

In one or more examples, the system 200 includes a number of the sections 238 that are coupled together using a number of instances of the connection assembly 100. In the example illustrated in FIG. 3, the system 200 includes the first section 216, the second section 218, and the third section 228. The first section 216 is coupled to the second section 218 using a first instance of the connection assembly 100. The third section 228 is coupled to the second section 218 using a second instance of the connection assembly 100. In some examples, the system 200 includes any number of additional sections, such as a fourth section 246, a fifth section 248, etc.

In one or more examples, the first section 216 includes or takes the form of the hose 204. The second section 218 includes or takes the form of the manifold 202. The third section 228 (and any additional sections, such as the fourth section 246, the fifth section 248, etc.) includes or takes the form of another hose, another manifold, or a pipe 220. In other examples, the first section 216, the second section 218, and the third section 228 (and any additional sections, such as the fourth section 246, the fifth section 248, etc.) can include or take the form of any suitable type of flexible gas-conveying component, such as a conduit, a tube, and the like (referred to generally herein as hose 204) or any suitable type of rigid gas-conveying component such as a pipe, a conduit, a tube, and the like (referred to generally herein as pipe 220).

Referring to FIG. 3, in one or more examples, the system 200 includes the air handler 222. An intake hose 212 (e.g., an example of the hose 204) includes an intake end that is coupled to the air handler 222 and an output end that is coupled to an intake end of the manifold 202 via the first instance of the connection assembly 100, also referred herein as an intake connection assembly 208. The manifold 202 includes a number of output ends. An output hose 214 (e.g., another example of the hose 204) includes an intake end that is coupled to at least one of the output ends of the manifold 202 via a second instance of the connection assembly 100, also referred to herein as an output connection assembly 210, and an output end that is positioned within the space 280 (e.g., confined space) to distribute air to the space 280 or remove air from the space 280.

In one or more examples, the air handler 222 or other air source is configured to distribute gas, such as air, to the space 280. As an example, the air handler 222 includes or takes the form of the fan 224, a blower, and the like. In one or more examples, the air handler 222 is configured to remove gas, such as air, from the space 280. As an example, the air handler 222 includes or takes the form a vacuum 226, a pump, and the like.

Referring now to FIGS. 1 and 3-22, the following are examples of the connection assembly 100, according to the present disclosure. The connection assembly 100 includes a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Referring to FIG. 1, as will be described in more detail herein, in various examples, the connection assembly 100 includes a number of components, including one or more of the fitting 102, the connector 104, the fitting cam-lock 274, the connector twist-lock 106, the fitting twist-lock 108, a connection lock 154, a cam-lock groove 276, a first cam-lock protrusion 258, a second cam-lock protrusion 260, a twist-lock protrusion 112, a twist-lock groove 114, a stop 138, a second twist-lock protrusion 134, a second twist-lock groove 136, a second stop 240, a fitting body 116, a fitting first end 118, a fitting first opening 122, a fitting second end 120, a fitting second opening 124, a fitting gasket 180, a connector body 144, a connector first end 146, a connector first opening 150, a connector second end 148, a connector second opening 152, a connector gasket 182, a fitting cap 186, a connector cap 190, a cap twist-lock 188, a connector lug 160, a fitting lug 158, and a fastener 162.

Figure 4:
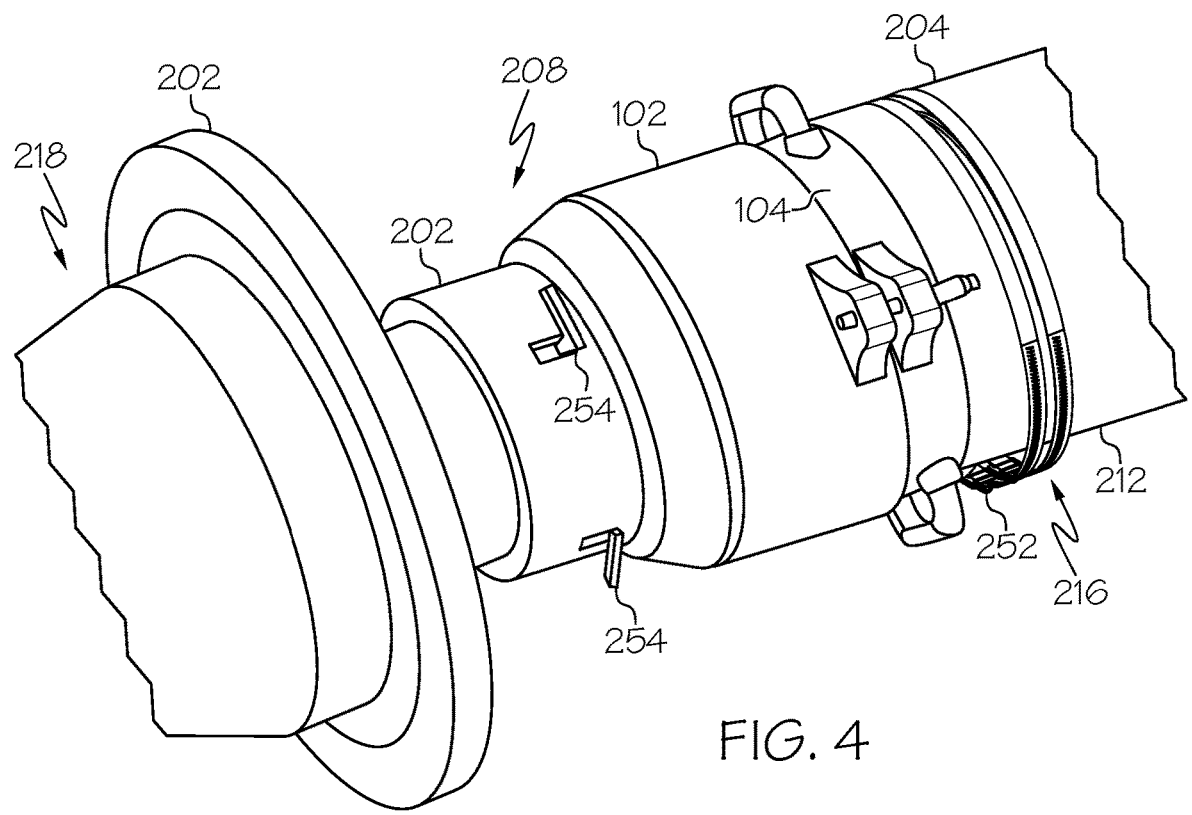
FIG. 4 is a schematic, perspective view of an example of a portion of the gas conveyance system, including an example of a manifold, a connection assembly, and a hose.
Figure 5:
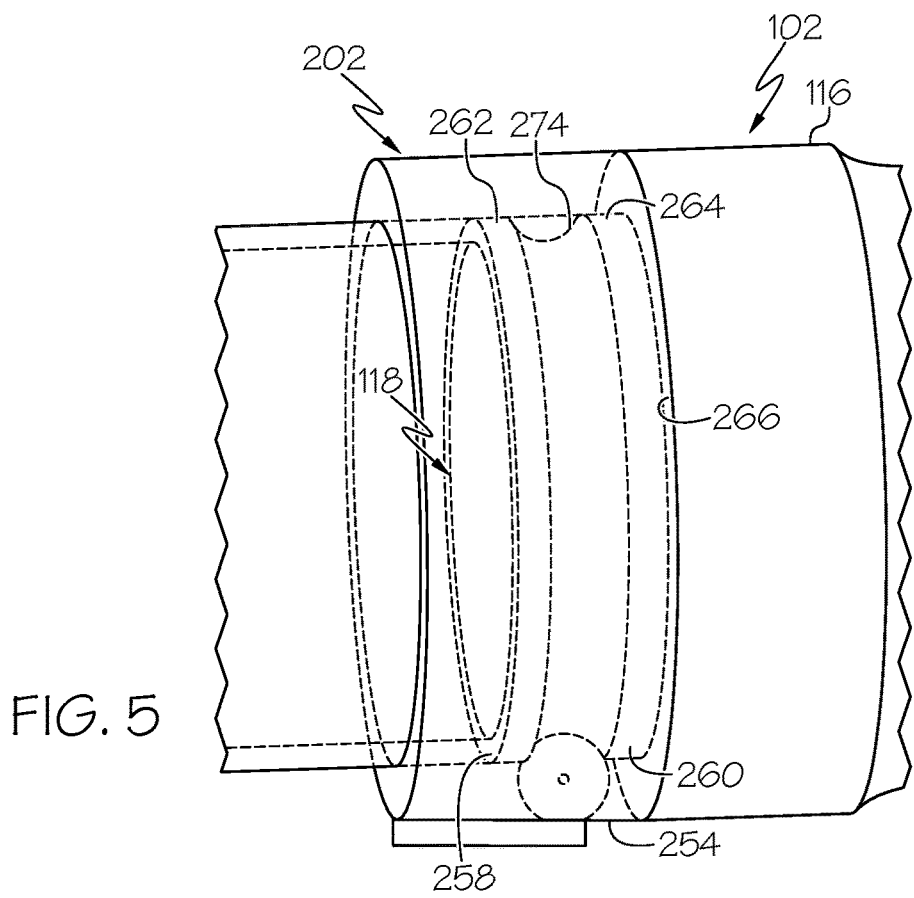
FIG. 5 is a schematic, perspective view of examples of the manifold and a fitting of the connection system.

Referring to FIGS. 1, 3 and 4, in one or more examples, the connection assembly 100 is configured to couple and decouple the sections 238, such as the first section 216, the second section 218, the third section 228, the fourth section 246, the fifth section 248, etc., of the system 200. In one or more examples, the connection assembly 100 includes the fitting 102 and the connector 104. The fitting 102 is configured to connect to the manifold 202. The fitting 102 includes the fitting cam-lock 274 and the fitting twist-lock 108. The connector 104 is configured to connect to the hose 204. The connector 104 includes the connector twist-lock 106. The fitting cam-lock 274 of the fitting 102 is configured to engage the manifold cam-lock 254 of the manifold 202. The fitting twist-lock 108 of the fitting 102 is configured to engage the connector twist-lock 106 of the connector 104 by rotating the connector 104 about the connection axis 110 relative to the fitting 102.

In one or more examples of the connection assembly 100, the fitting 102 and the connector 104 are connected by a transition fit.

Figure 11:
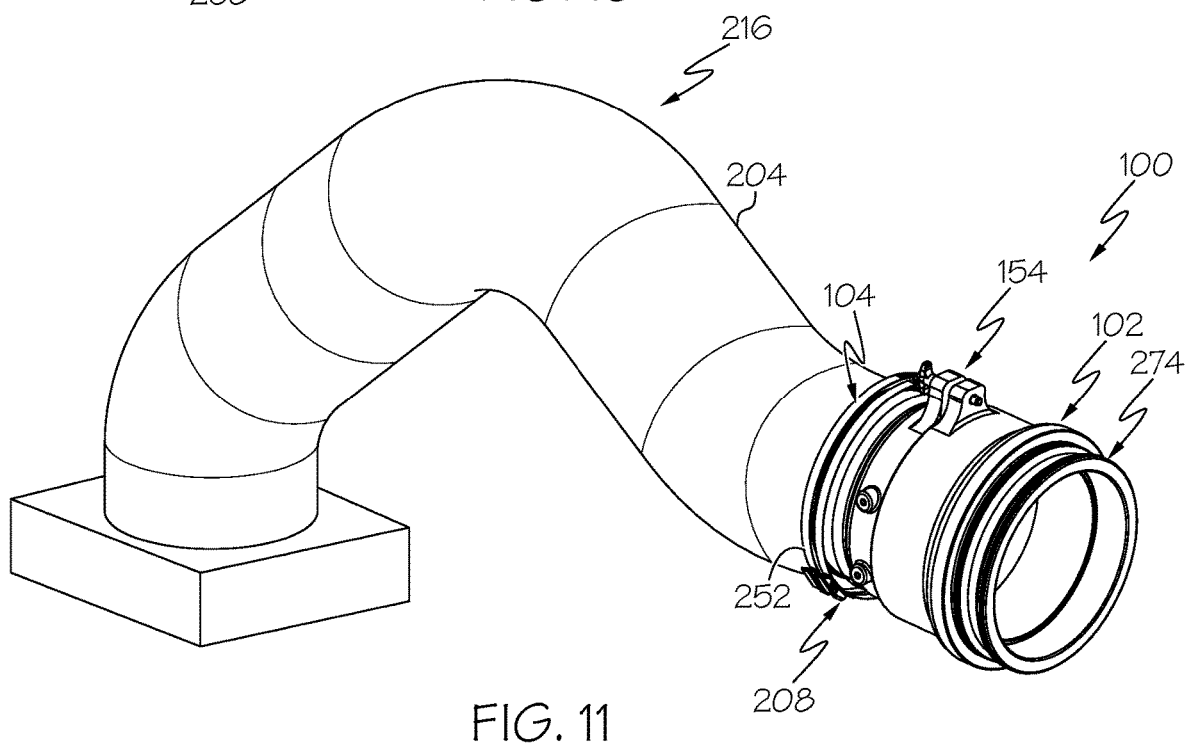
FIG. 11 is a schematic, perspective view of an example of the fitting of the connection assembly coupled to the hose.

FIGS. 4 and 11 schematically illustrate an example of the connection assembly 100 for coupling two of the sections 238 of the system 200 together. In the illustrated examples, the first section 216 is the intake hose 212, the second section 218 is the manifold 202 or the pipe 220 (not shown in FIG. 11), and the connection assembly 100 is the intake connection assembly 208. The intake connection assembly 208 includes the fitting 102 and the connector 104. The fitting 102 is coupled to an intake end of the manifold 202 via, for example, coupling engagement of the manifold cam-lock 254 of the manifold 202 and the fitting cam-lock 274 of the fitting 102. The connector 104 is coupled to an output end of the intake hose 212 via, for example, an instance of a clamp 252, such as a hose clamp. The fitting 102 and the connector 104 are coupled together via mating engagement of the fitting twist-lock 108 of the fitting 102 and the connector twist-lock 106 of the connector 104.

Figure 10:
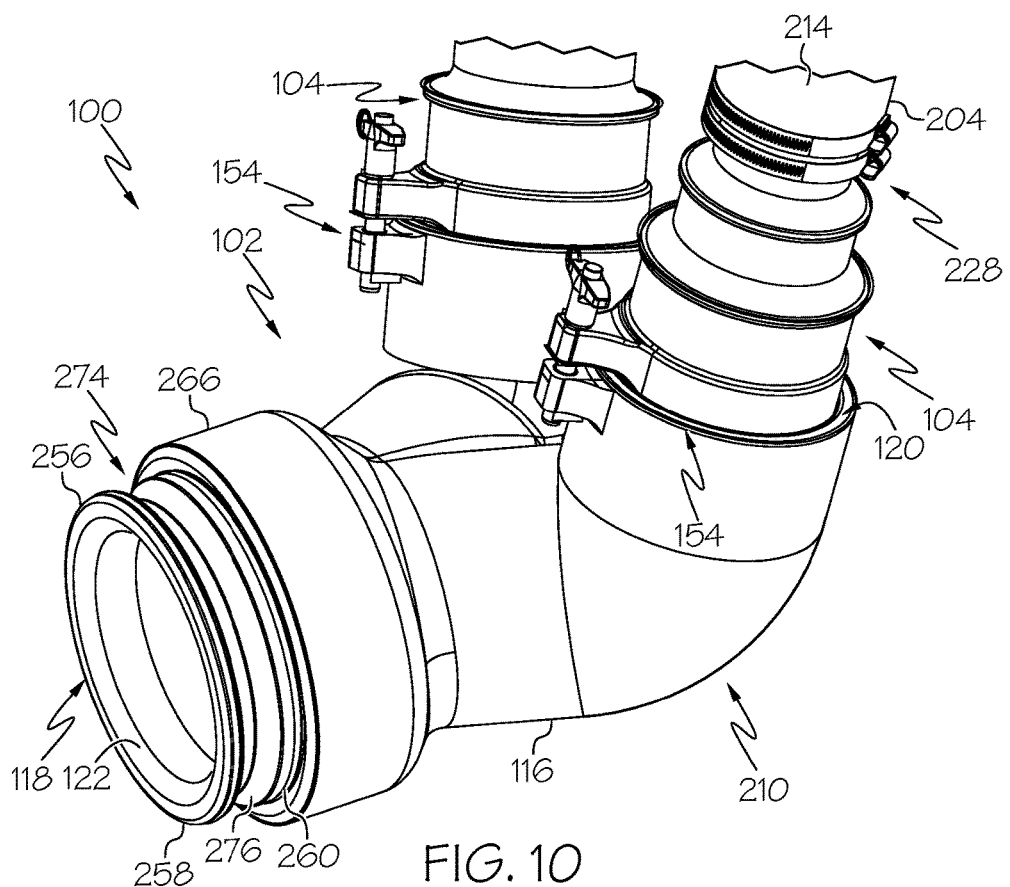
FIG. 10 is a schematic, perspective view of an example of the fitting of the connection assembly coupled to a pair of hoses.

FIG. 10 schematically illustrates another example of the connection assembly 100 for coupling two of the sections 238 of the system 200 together. In the illustrated example, the first the second section 218 is the manifold 202 or the pipe 220 (not shown in FIG. 10), the third section 228 is the hose 204, and the connection assembly 100 is the output connection assembly 210. The output connection assembly 210 includes the fitting 102 and the connector 104. The fitting 102 is coupled to an output end of the manifold 202 or the pipe 220 via, for example, coupling engagement of the manifold cam-lock 254 of the manifold 202 and the fitting cam-lock 274 of the fitting 102. The connector 104 is coupled to an intake end of the output hose 214 via, for example, an instance of the clamp 252, such as a hose clamp. The fitting 102 and the connector 104 are coupled together via mating engagement of the fitting twist-lock 108 of the fitting 102 and the connector twist-lock 106 of the connector 104.

The example illustrated in FIG. 10 depicts an implementation of the connection assembly 100 that includes one intake and two outputs. As an example, the fitting 102 includes one intake end/opening and two output ends/openings. Each connector 104 includes one intake end/opening and one output end/opening. The input of the connector 104 is coupled to the output of the fitting 102 via the twist-lock connection or mating engagement of the fitting twist-lock 108 and the connector twist-lock 106. The intake end/opening of the fitting 102 is coupled to an output end of the manifold 202 via coupling engagement of the manifold cam-lock 254 of the manifold 202 (not shown in FIG. 10) and the fitting cam-lock 274 of the fitting 102.

Referring to FIGS. 1 and 3-18, in one or more examples of the connection assembly 100, the fitting 102 includes the fitting body 116, the fitting first end 118, and the fitting second end 120. The fitting first end 118 includes the fitting first opening 122. The fitting second end 120 includes the fitting second opening 124. The connector 104 includes the connector body 144, the connector first end 146, and the connector second end 148. The connector first end 146 includes the connector first opening 150. The connector second end 148 includes the connector second opening 152. The fitting cam-lock 274 is located proximate to the fitting first end 118. The fitting twist-lock 108 is located proximate to the fitting second end 120. The connector twist-lock 106 is located proximate to the connector first end 146.

Generally, during coupling of the fitting 102 and the connector 104, at least a portion of the connector first end 146 is inserted in the fitting second opening 124 of the fitting second end 120 such that the fitting second opening 124 and the connector first opening 150 are in fluid communication along the connection axis 110. Insertion of the connector first end 146 in the fitting second opening 124 of the fitting second end 120 positions the twist-lock protrusion 112 within the twist-lock groove 114. Rotation of the connector 104 about the connection axis 110 relative to the fitting 102 moves the twist-lock protrusion 112 along the twist-lock groove 114 to a secure position.

In one or more examples, the fitting body 116 and the connector body 144 include a generally tubular body having an at least approximately circular cross-sectional shape viewed along the connection axis 110. As such, in one or more examples, the fitting first end 118 and the fitting second end 120 are generally tubular such that the fitting first opening 122 and the fitting second opening 124 are generally circular in shape. Similarly, in one or more examples, the connector first end 146 and the connector second end 148 are generally tubular such that the connector first opening 150 and the connector second opening 152 are generally circular. However, in other examples, the fitting 102 and the connector 104 can have other shapes.

Referring to FIGS. 1, 4, 7, 8, 10 and 18, in one or more examples, the connection assembly 100 includes the connection lock 154. The connection lock 154 selectively enables rotation of the connector 104 about the connection axis 110 relative to the fitting 102 or restricts rotation of the connector 104 about the connection axis 110 relative to the fitting 102.

In one or more examples, the connection lock 154 includes the connector lug 160 and the fitting lug 158. The fitting lug 158 projects outwardly from the fitting body 116 of the fitting 102. The connector lug 160 projects outwardly from the connector body 144 of the connector 104. The connection lock 154 also includes or utilizes the fastener 162 that releasably connects the fitting lug 158 and the connector lug 160 together.

In one or more examples, the fitting lug 158 and the connector lug 160 are respectively located on the fitting 102 and the connector 104 such that upon rotating the connector 104 about the connection axis 110 relative to the fitting 102 to securely connect the fitting 102 and the connector 104 via the twist-lock connection of the fitting twist-lock 108 and the connector twist-lock 106, the fitting lug 158 and the connector lug 160 are at least approximately aligned and in a face-to-face relationship to each other. In one or more examples, each one of the fitting lug 158 and the connector lug 160 includes a lock aperture formed therethrough that is configured (e.g., suitably sized and shaped) to receive the fastener 162. With the fitting lug 158 and the connector lug 160 aligned, the lock aperture of each is at least approximately aligned such that the fastener 162 can be inserted through the lock aperture of both the fitting lug 158 and the connector lug 160. The fastener 162 can be any suitable fastener, such as, but not limited to, a pad lock, a pin, a threaded fastener, a zip tie, a lockout tag, and the like.

Figure 6:
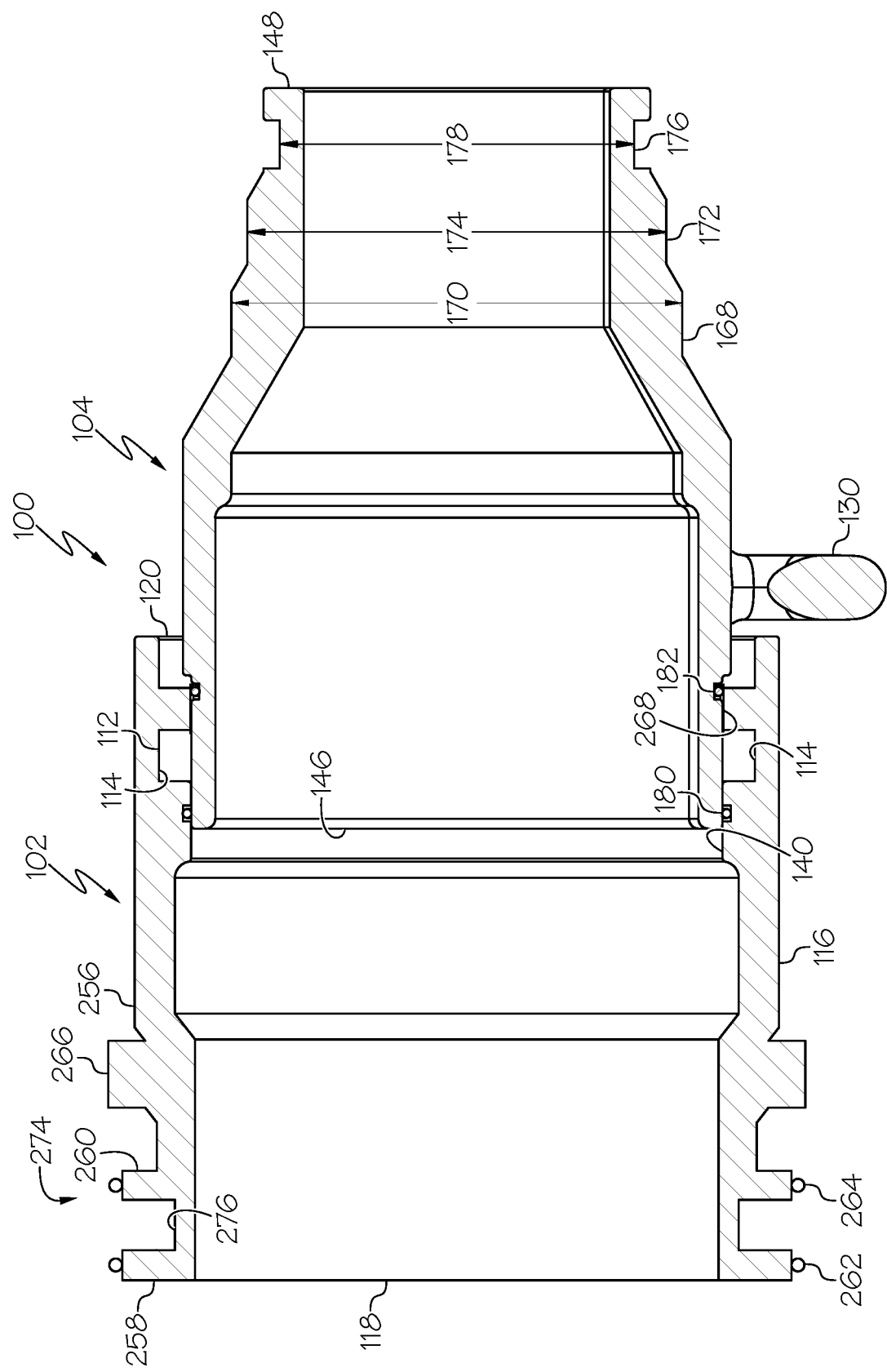
FIG. 6 is a schematic, section view of an example of a portion of the gas conveyance system, including examples of the manifold, the fitting of the connection assembly, a connector of the connection assembly, and the hose.
Figure 7:
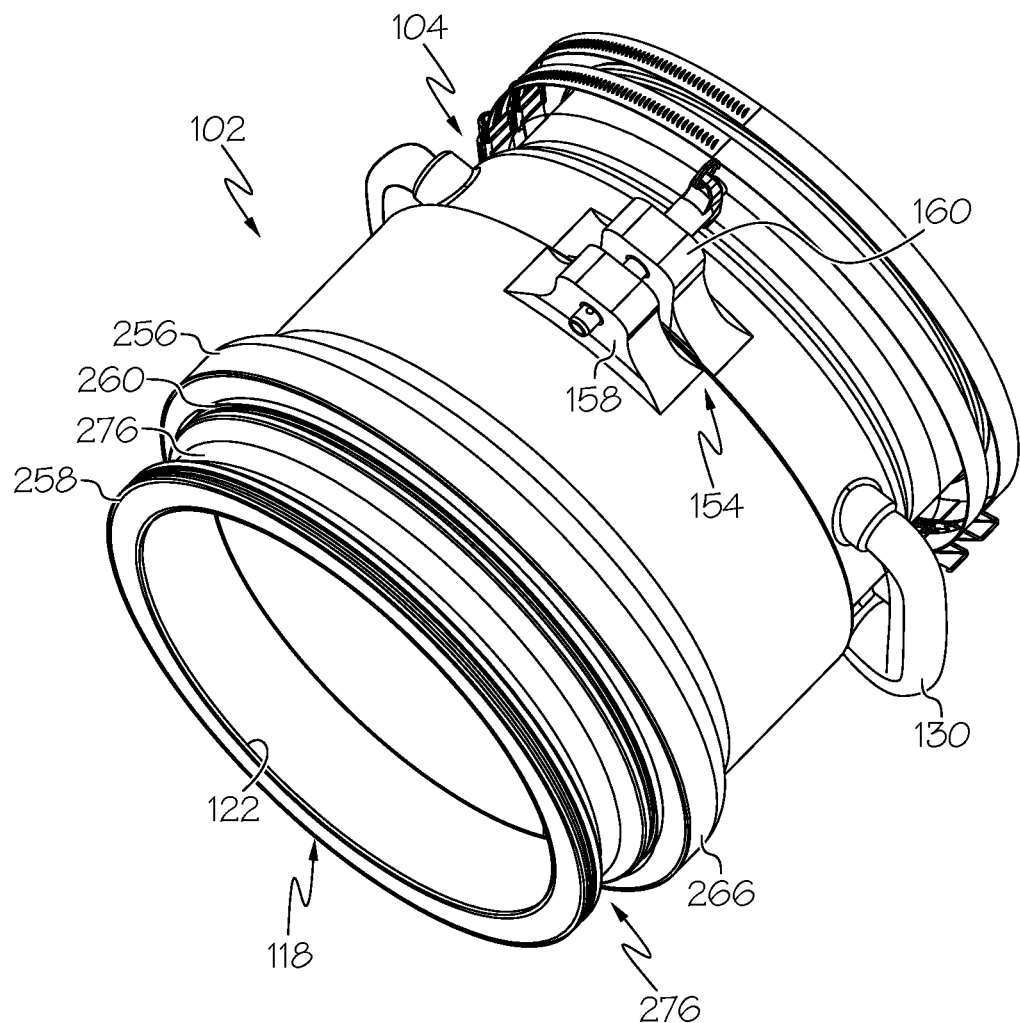
FIG. 7 is a schematic, perspective view of an example of the fitting of the connection assembly.
Figure 8:
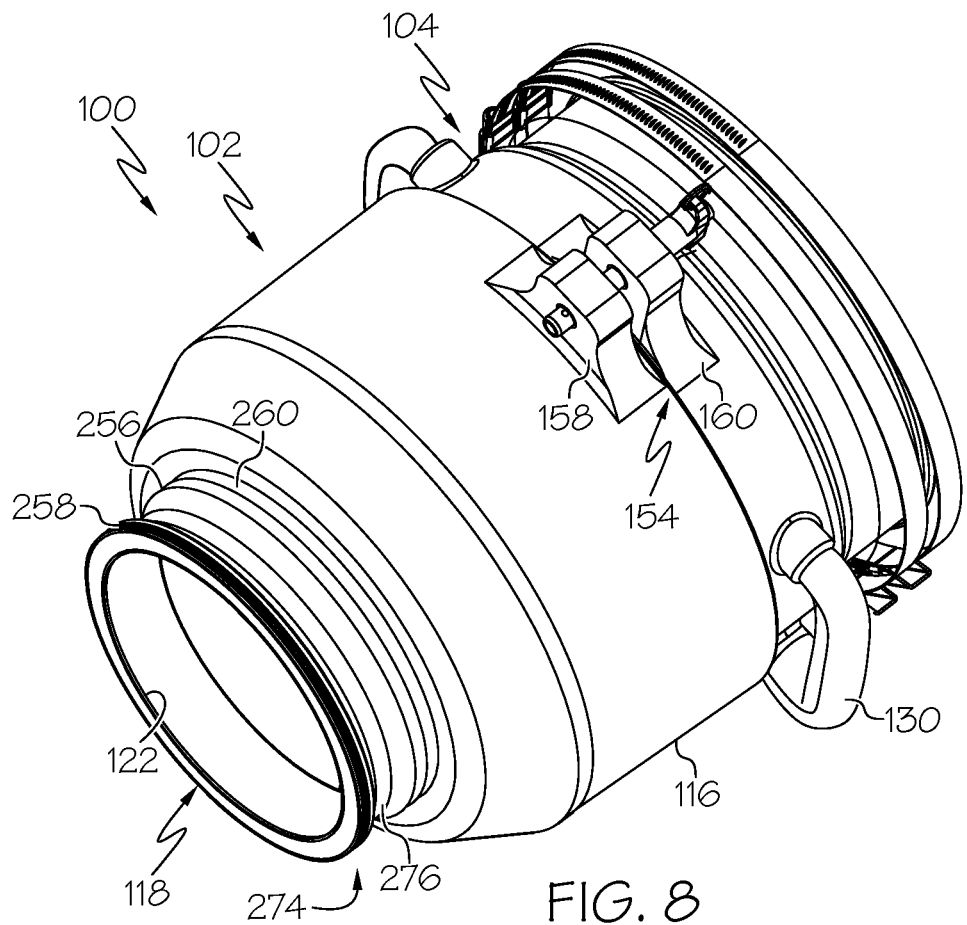
FIG. 8 is a schematic, perspective view of an example of the fitting of the connection assembly.
Figure 9:
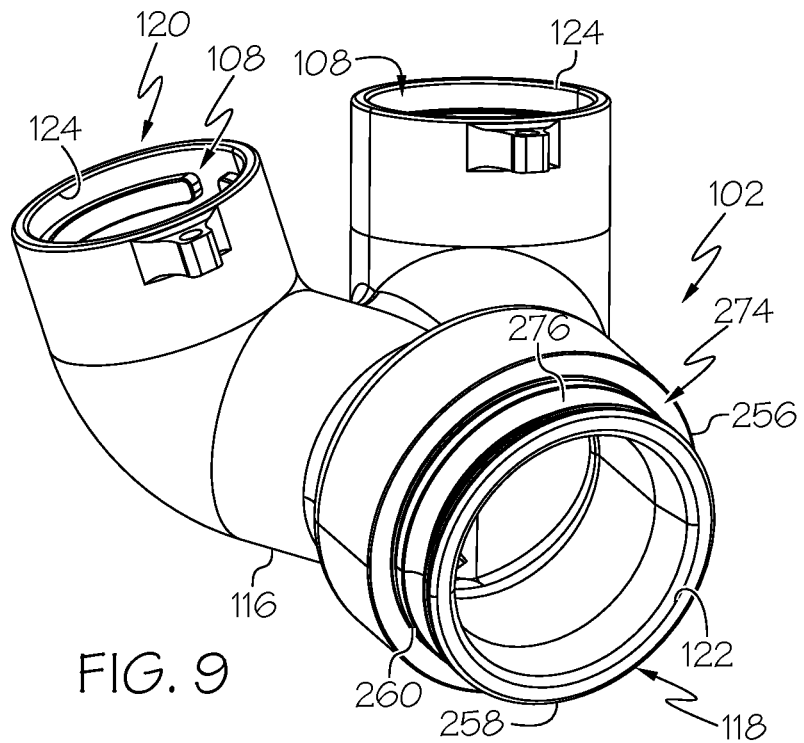
FIG. 9 is a schematic, perspective view of an example of the fitting of the connection assembly.

Referring to FIGS. 1, 6 and 10, in one or more examples of the connection assembly 100, the connector 104 includes a connector first section 168 and a connector second section 172. The connector first section 168 extends from the connector body 144. The connector first section 168 has a first outer dimension 170. The connector second section 172 extends from the connector first section 168. The connector second section 172 has a second outer dimension 174. The second outer dimension 174 is less than the first outer dimension 170. In one or more examples of the connection assembly 100, the connector 104 also includes a connector third section 176. The connector third section 176 extends from the connector second section 172. The connector third section 176 has a third outer dimension 178. The third outer dimension 178 is less than the second outer dimension 174.

In these examples, one of the connector first section 168, the connector second section 172, or the connector third section 176 of the connector second end 148 is configured to be inserted within a hose opening of the hose 204. The connector first section 168, the connector second section 172, or the connector third section 176 each having different outer dimensions (e.g., diameters) enables a single instance of the connector 104 to be usable with hoses of different diameters. As examples, the connector 104 can be inserted up to the connector first section 168 for large diameter hoses, inserted up to the connector second section 172 for medium diameter hoses, and inserted up to the connector third section 176 for small diameter hoses.

Referring to FIGS. 1 and 6, in one or more examples of the connection assembly 100, the fitting 102 includes the fitting gasket 180. The fitting gasket 180 is located on a fitting inner surface 140 of the fitting body 116. The fitting gasket 180 is located proximate to the fitting second end 120. In one or more examples, with the connector first end 146 received by the fitting second end 120, the fitting gasket 180 is located proximate (e.g., at or near) the connector first opening 150. The fitting gasket 180 is configured to contact and form an air-tight seal with a connector outer surface 268 when the connector first end 146 is inserted within the fitting second opening 124 of the fitting second end 120.

In one or more examples of the connection assembly 100, the connector 104 includes the connector gasket 182. The connector gasket 182 is located on the connector outer surface 268 of the connector body 144. The connector gasket 182 is located proximate (e.g., at or near) the connector first end 146. In one or more examples, with the connector first end 146 received by the fitting second end 120, the connector gasket 182 is located proximate (e.g., at or near) the fitting second opening 124. The connector gasket 182 is configured to contact and form an air-tight seal with the fitting inner surface 140 when the connector first end 146 is inserted within the fitting second opening 124 of the fitting second end 120.

In one or more examples of the connection assembly 100, the fitting 102 includes the fitting gasket 180 and the connector 104 includes the connector gasket 182. With the connector first end 146 received by the fitting second end 120, the fitting gasket 180 is located at the connector first opening 150 and the connector gasket 182 is located at the fitting first opening 122.

Referring now to FIGS. 1 and 3-22, the following are examples of the fitting 102, according to the present disclosure. The fitting 102 includes a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Referring to FIG. 1, as will be described in more detail herein, in various examples, the fitting 102 includes a number of components, including one or more of the fitting cam-lock 274, the cam-lock groove 276, the first cam-lock protrusion 258, the second cam-lock protrusion 260, the connector twist-lock 106, the twist-lock protrusion 112, the twist-lock groove 114, the stop 138, the second twist-lock protrusion 134, the second twist-lock groove 136, the second stop 240, the fitting body 116, the fitting first end 118, the fitting first opening 122, the fitting second end 120, the fitting second opening 124, the fitting gasket 180, a first cam-lock gasket 262, a second cam-lock gasket 264, and a flange 266.

Referring to FIGS. 1 and 3-18, in one or more examples, the fitting 102 includes the fitting body 116. In one or more examples, the fitting body 116 has the connection axis 110. As an example, the connection axis 110 passes through the fitting body 116. The fitting 102 includes the fitting first end 118. The fitting first end 118 includes the fitting first opening 122. The fitting 102 includes the fitting second end 120. The fitting second end 120 includes the fitting second opening 124. The fitting 102 includes the fitting cam-lock 274. The fitting cam-lock 274 is located proximate to (e.g., at or near) the fitting first end 118. The fitting 102 includes the fitting twist-lock 108. The fitting twist-lock 108 is located proximate to the fitting second end 120. The fitting cam-lock 274 is configured to engage the manifold cam-lock 254 of the manifold 202 of the gas conveyance system 200. The fitting twist-lock 108 is configured to engage the connector twist-lock 106 of the connector 104 by rotating the connector 104 about the connection axis 110 relative to the fitting 102.

Referring to FIGS. 1 and 4-11, in one or more examples of the fitting 102, the fitting cam-lock 274 includes the cam-lock groove 276. The cam-lock groove 276 is formed on a fitting outer surface 256 (e.g., FIGS. 6-10) of the fitting body 116. The cam-lock groove 276 is located proximate the fitting first end 118. The cam-lock groove 276 of the fitting cam-lock 274 is configured to receive or be otherwise put into mating engagement with the manifold cam-lock 254 of the manifold 202. As an example, the cam-lock groove 276 represents or is formed by a localized reduction in the outer dimension (e.g., diameter) of the fitting body 116 along the fitting first end 118.

In one or more examples of the fitting 102, the cam-lock groove 276 is annular. However, in other examples, the cam-lock groove 276 can be semi-annular, be formed by one or more segmented recesses, or have another suitable configuration.

In one or more examples, the manifold cam-lock 254 includes features common to cam-lock connection assemblies. As an example, the manifold cam-lock 254 includes or takes the form of a lever cam lock that is connected to and rotatable relative to the manifold 202. The lever cam lock can include a cam lever and a cam lobe. Rotation of the cam lever positions at least a portion of the cam lobe in a locked state (or locked engagement) within the cam-lock groove 276 of the fitting cam-lock 274 to securely retain the fitting first end 118 of the fitting 102 within the opening of the manifold 202. Counter rotation of the cam lever positions the cam lobe in an unlocked state out of the cam-lock groove 276 of the fitting cam-lock 274 to release the fitting first end 118 of the fitting 102 from within the opening of the manifold 202. The manifold cam-lock 254 can include any other suitable cam-lock configurations, such as a single lever cam lock, a double lever cam lock, and the like, suitable for selectively locking the fitting 102 and the manifold 202 together via engagement of the manifold cam-lock 254 and the fitting cam-lock 274.

Referring to FIGS. 1 and 4-11, in one or more examples of the fitting 102, the fitting cam-lock 274 includes the first cam-lock protrusion 258 and the second cam-lock protrusion 260. The first cam-lock protrusion 258 projects from the fitting outer surface 256 of the fitting body 116. The second cam-lock protrusion 260 projects from the fitting outer surface 256. The second cam-lock protrusion 260 is spaced away from the first cam-lock protrusion 258 along the connection axis 110. The cam-lock groove 276 is formed between the first cam-lock protrusion 258 and the second cam-lock protrusion 260.

In one or more examples, the outer dimension (e.g., diameter) of the fitting body 116 at the first cam-lock protrusion 258 and the second cam-lock protrusion 260 is at least approximately equal to the inner dimension (e.g., diameter) of the end of the manifold 202 or the pipe 220 that receives the fitting first end 118 of the fitting 102.

Referring to FIGS. 1 and 5-11, in one or more examples of the fitting 102, the first cam-lock protrusion 258 is annular, the second cam-lock protrusion 260 is annular, and the cam-lock groove 276 is annular.

The cam-lock connection is characterized by its structural integrity and ease of use. The connection includes the fitting cam-lock 274 and the manifold cam-lock 254 that are formed on the interconnected components (e.g., fitting 102 and manifold 202) of the connection assembly 100. In one or more examples, the twist-lock protrusion 112 includes a profile shape and the twist-lock groove 114 includes a complementary groove shape, thereby ensuring secure engagement between the fitting 102 and the connector 104 and minimizing the risk of misalignment during coupling of the sections 238 of the system 200.

Referring to FIGS. 1 and 5-10, in one or more examples, the fitting 102 includes the first cam-lock gasket 262 and the second cam-lock gasket 264. The first cam-lock gasket 262 is coupled to the first cam-lock protrusion 258. The second cam-lock gasket 264 is coupled to the second cam-lock protrusion 260. The first cam-lock gasket 262 and the second cam-lock gasket 264 are configured to contact and form an air-tight seal with the inner surface of the manifold 202 when the fitting first end 118 is inserted within the opening of the manifold 202.

Referring to FIGS. 1 and 5-10, in one or more examples, the fitting 102 includes the flange 266. The flange 266 projects from the fitting outer surface 256 of the fitting body 116. The flange 266 is located between the fitting cam-lock 274 and the fitting second end 120. The flange 266 forms a stop that limits insertion of the fitting first end 118 of the fitting 102 within the manifold 202. The flange 266 has an outer dimension (e.g., diameter) that is greater than the outer dimension (e.g., diameter) of the fitting cam-lock 274, such as the outer dimension of the first cam-lock protrusion 258 and the second cam-lock protrusion 260. In one or more examples of the fitting 102, the flange 266 is annular.

Referring to FIGS. 1 and 6-9, in one or more examples of the fitting 102, the fitting body 116 includes a first inner dimension 270 at the fitting first end 118 and a second inner dimension 272 at the fitting second end 120. In one or more examples, the first inner dimension 270 and the second inner dimension 272 are at least approximately the same (e.g., as shown by example in FIGS. 6 and 7). In one or more examples, the first inner dimension 270 and the second inner dimension 272 are different (e.g., as shown by example in FIGS. 8 and 9). In one or more examples, the second inner dimension 272 is less that the first inner dimension 270.

Referring to FIGS. 1 and 14-17, in one or more examples of the fitting 102, the fitting twist-lock 108 includes the twist-lock groove 114. The twist-lock groove 114 is formed in the fitting inner surface 140 of the fitting body 116. The twist-lock groove 114 is located proximate to the fitting second end 120. The twist-lock groove 114 is configured to receive the twist-lock protrusion 112 projecting from the connector outer surface 268 of the connector 104. The twist-lock protrusion 112 is moved to a secured position in the twist-lock groove 114 by rotating the connector 104 about the connection axis 110 relative to the fitting 102.

In one or more examples, the fitting 102 includes the stop 138. The stop 138 is disposed along the twist-lock groove 114. The stop 138 limits rotation of the connector 104 about the connection axis 110 relative to the fitting 102. In one or more examples of the fitting 102, the twist-lock groove 114 is annular.

In one or more examples of the fitting 102, the fitting twist-lock 108 includes the second twist-lock groove 136. The second twist-lock groove 136 is formed in the fitting inner surface 140 of the fitting body 116. The second twist-lock groove 136 is located proximate the fitting second end 120. The twist-lock groove 114 is configured to receive the second twist-lock protrusion 134 projecting from the connector outer surface 268 of the connector 104. The second twist-lock protrusion 134 is moved to a secured position in the second twist-lock groove 136 by rotating the connector 104 about the connection axis 110 relative to the fitting 102.

In one or more examples of the fitting 102, the stop 138 is disposed between the twist-lock groove 114 and the second twist-lock groove 136. The stop 138 limits rotation of the connector 104 about the connection axis 110 relative to the fitting 102. In one or more examples of the fitting 102, the twist-lock groove 114 is semi-annular and the second twist-lock groove 136 is semi-annular.

Figure 12:
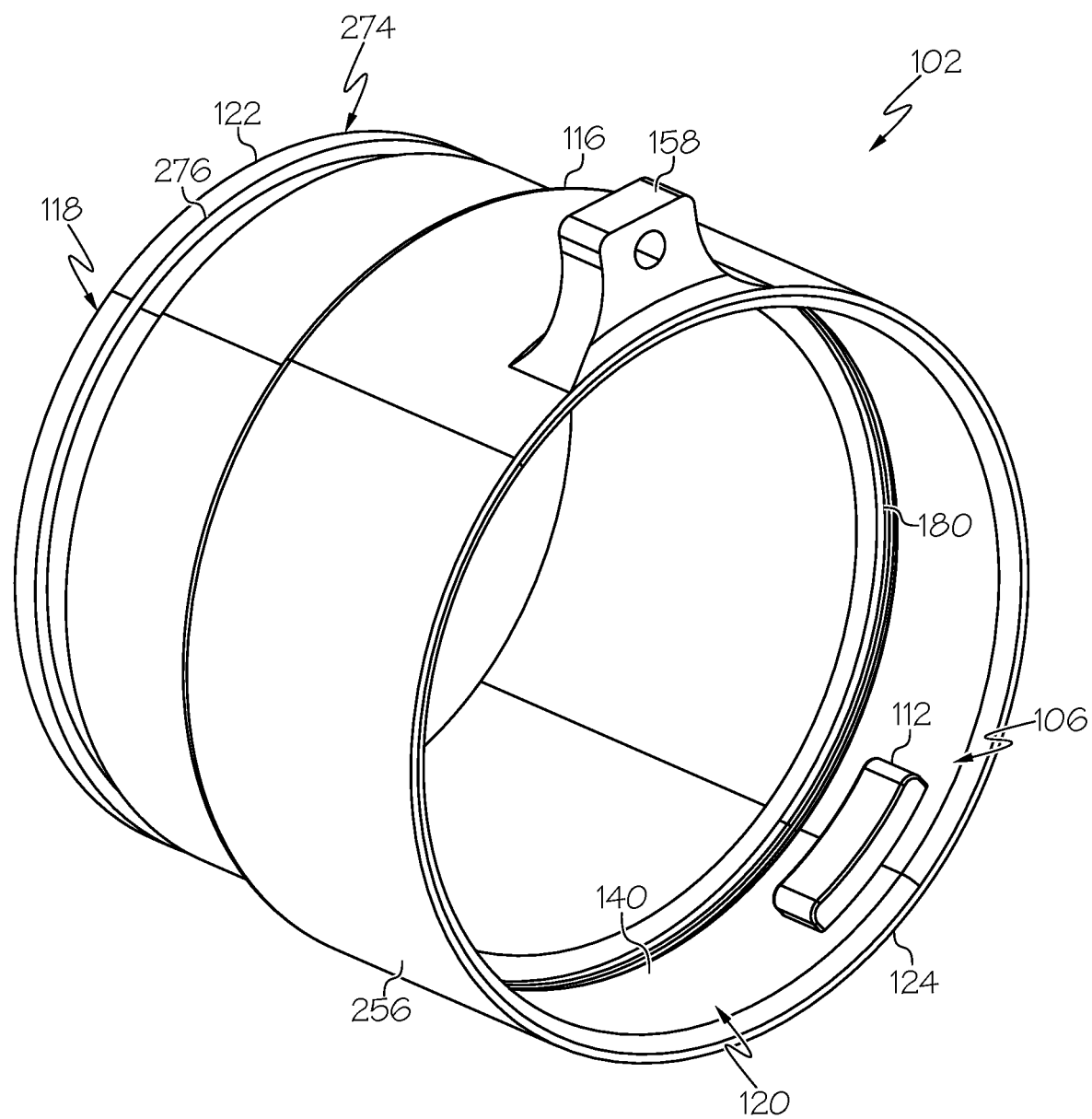
FIG. 12 is a schematic, perspective view of an example of the fitting of the connection assembly.
Figure 13:
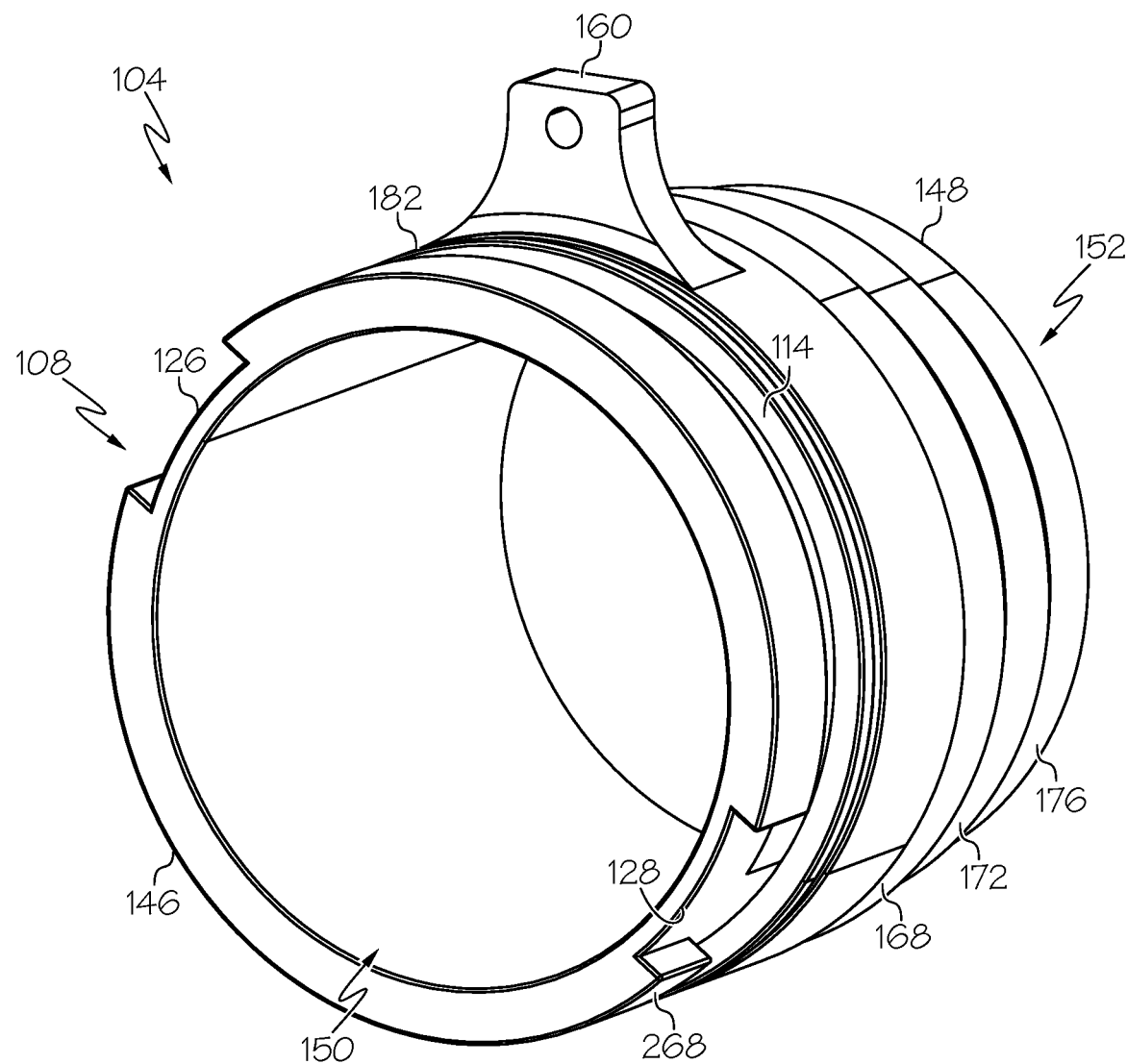
FIG. 13 is a schematic, perspective view of an example of the connector of the connection assembly.
Figure 14:
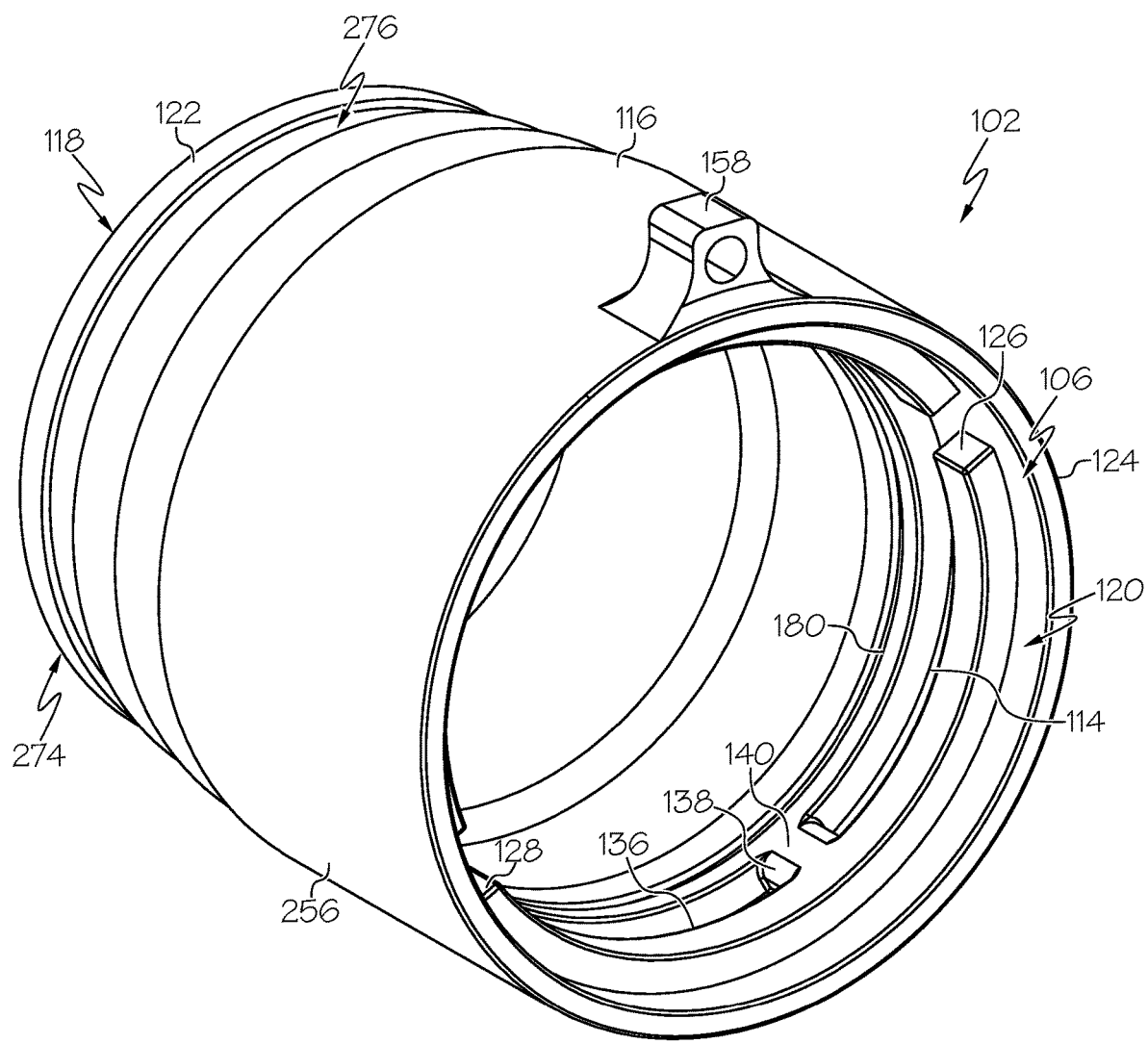
FIG. 14 is a schematic, perspective view of an example of the fitting of the connection assembly.
Figure 15:
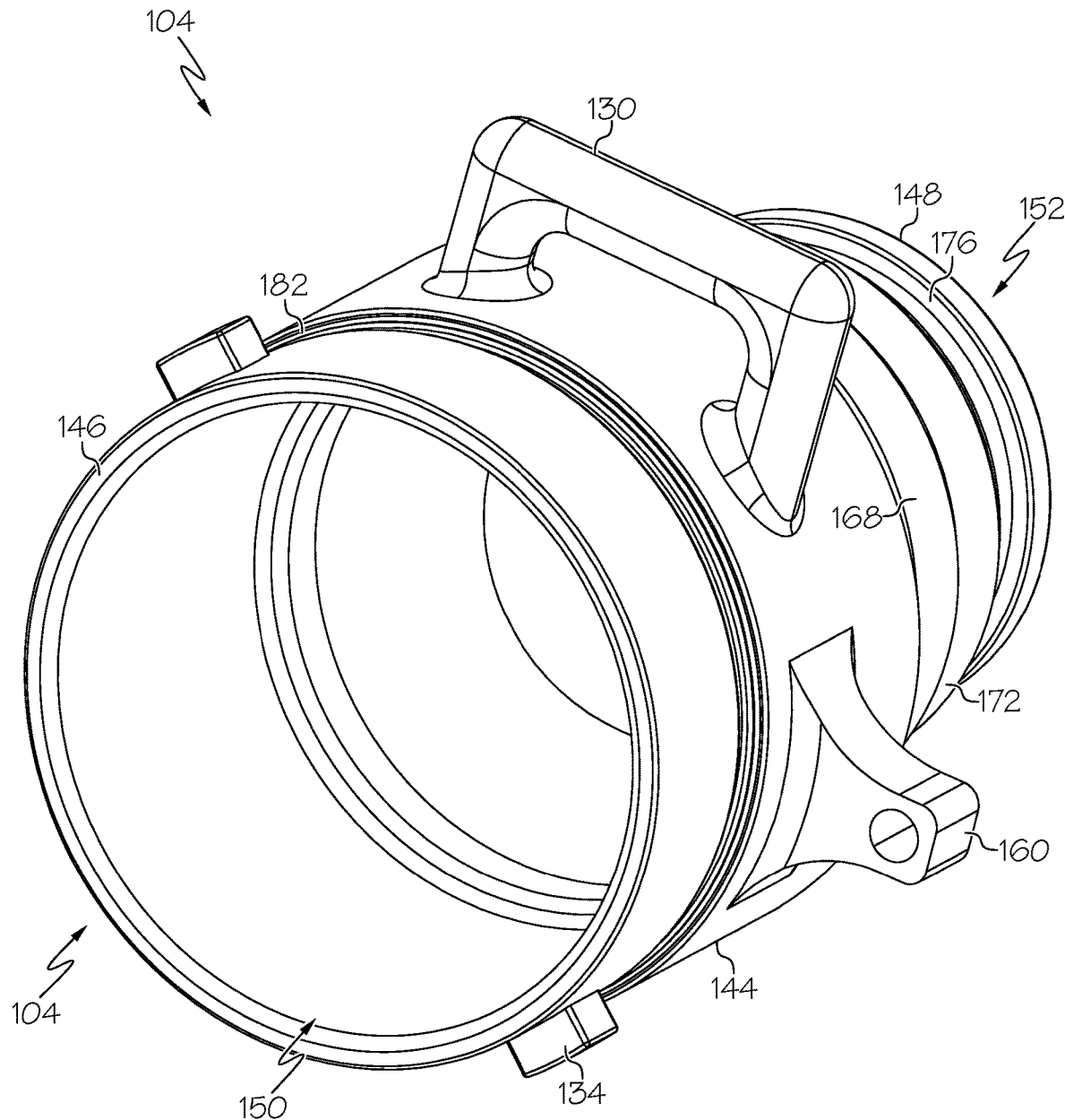
FIG. 15 is a schematic, perspective view of an example of the connector of the connection assembly.
Figure 16:
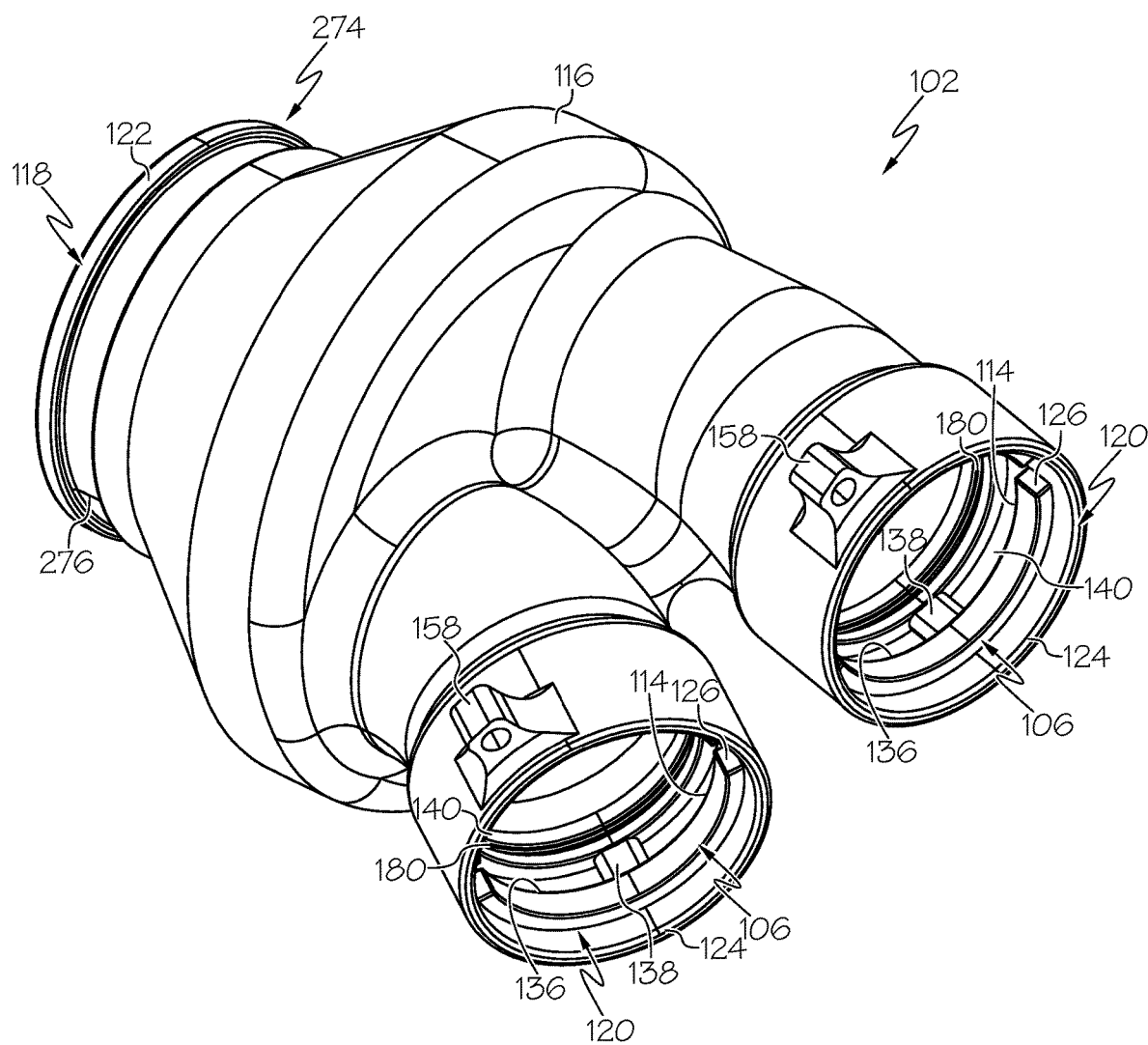
FIG. 16 is a schematic, perspective view of an example of the fitting of the connection assembly.
Figure 17:
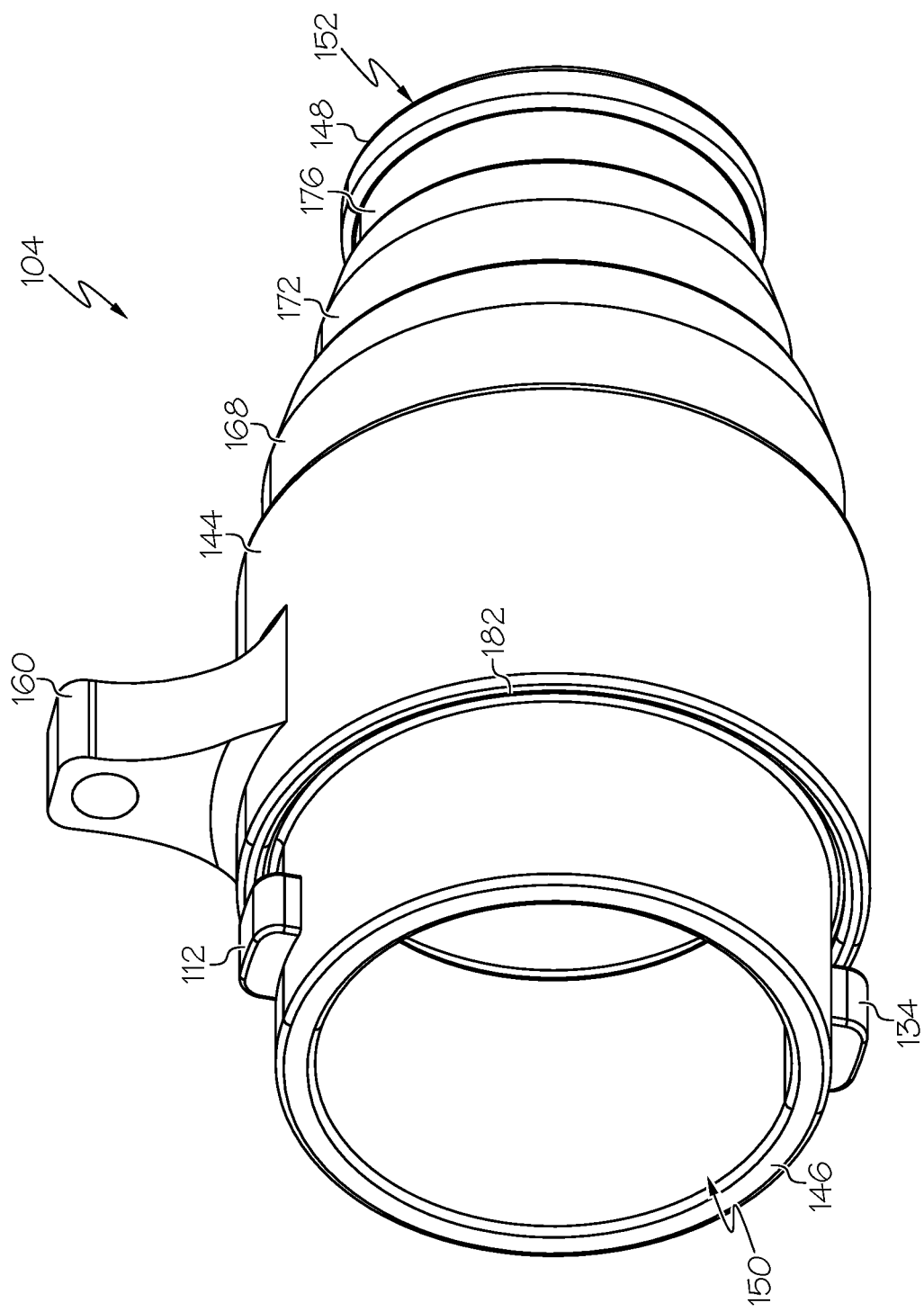
FIG. 17 is a schematic, perspective view of an example of the connector of the connection assembly.
Figure 18:
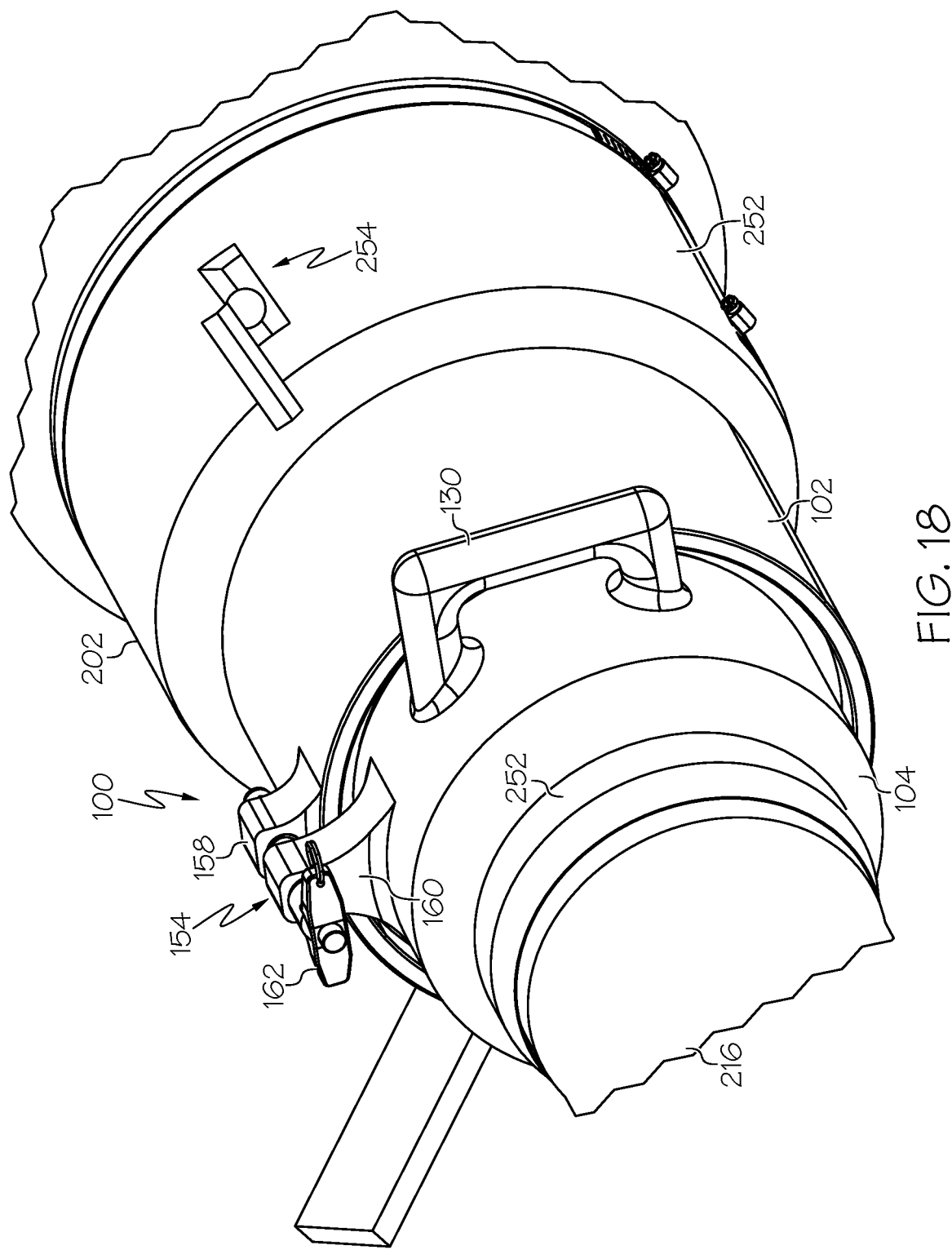
FIG. 18 is a schematic, perspective view of an example of the connection assembly joining the hose and the manifold.

Referring to FIGS. 1, 12 and 13, in one or more examples of the fitting 102, the fitting twist-lock 108 includes the twist-lock protrusion 112. The twist-lock protrusion 112 projects from the fitting inner surface 140. The twist-lock protrusion 112 is located proximate to the fitting second end 120. The twist-lock protrusion 112 is configured to fit in a twist-lock groove 114 formed in a connector outer surface 268 of the connector 104. The twist-lock protrusion 112 is moved to a secured position in the twist-lock groove 114 by rotating the connector 104 about the connection axis 110 relative to the fitting 102.

In one or more examples of the fitting 102, the fitting twist-lock 108 includes the second twist-lock protrusion 134. The second twist-lock protrusion 134 projects from the fitting inner surface 140. The second twist-lock protrusion 134 is located proximate to the fitting second end 120. The second twist-lock protrusion 134 is configured to fit in a second twist-lock groove 136 formed in the connector outer surface 268 of the connector 104. The second twist-lock protrusion 134 is moved to a secured position in the second twist-lock groove 136 by rotating the connector 104 about the connection axis 110 relative to the fitting 102.

The protrusion-and-groove connection is characterized by its structural integrity and case of use. The connection includes the twist-lock protrusion 112 and the twist-lock groove 114 that are formed on the mating surfaces of the interconnected components (e.g., fitting 102 and connector 104) of the connection assembly 100. In one or more examples, the twist-lock protrusion 112 includes a profile shape and the twist-lock groove 114 includes a complementary groove shape, thereby ensuring secure engagement between the fitting 102 and the connector 104 and minimizing the risk of misalignment during coupling of the sections 238 of the system 200.

The twist-lock protrusion 112 and the twist-lock groove 114 of the fitting twist-lock 108 and the connector twist-lock 106 are versatile and compatible with a wide range of materials, including but not limited to metal, plastic, and composite materials. The dimensions, angles, and tolerances of the twist-lock protrusion 112 and the twist-lock groove 114 can be adapted to suit specific application requirements, providing a customizable solution. Accordingly, the connection assembly 100 can be manufactured using a wide variety of materials and manufacturing techniques.

Referring to FIGS. 12-17, in one or more examples, the twist-lock groove 114 includes a recess 126. The recess 126 receives the twist-lock protrusion 112 such that the twist-lock protrusion 112 is positioned within the twist-lock groove 114 upon the connector 104 being applied to the fitting 102. In one or more examples, the second twist-lock groove 136 includes a second recess 128. The second recess 128 receives the second twist-lock protrusion 134 such that the second twist-lock protrusion 134 is positioned within the second twist-lock groove 136 upon the connector 104 being applied to the fitting 102.

In one or more examples, the second twist-lock groove 136 includes the second stop 240. The second stop 240 limits rotation of the connector 104 about the connection axis 110 relative to the fitting 102. As an example, the second stop 240 is located within the second twist-lock groove 136 such that the second twist-lock protrusion 134 engages the second stop 240 upon sufficient rotation of the connector 104 about the connection axis 110 relative to the fitting 102 to securely couple the fitting 102 and the connector 104 together.

In one or more examples, the twist-lock protrusion 112 and the second twist-lock protrusion 134 are diametrically opposite to each other. In one or more examples, the twist-lock groove 114 and the second twist-lock groove 136 are semi-annular. In one or more examples, the stop 138 and the second stop 240 are diametrically opposite to each other.

Referring to FIGS. 1 and 12-18, in one or more examples, the fitting 102 includes the fitting lug 158. The fitting lug 158 projects from the fitting outer surface 256 of the fitting body 116. The fitting lug 158 is configured to connect to the connector lug 160 projecting from the connector outer surface 268 of the connector 104.

Referring to FIGS. 1, 6, 12, 14 and 16, in one or more examples, the fitting 102 includes the fitting gasket 180. The fitting gasket 180 is located on the fitting inner surface 140 of the fitting body 116. The fitting gasket 180 is located proximate to the fitting second end 120.

Figure 19:
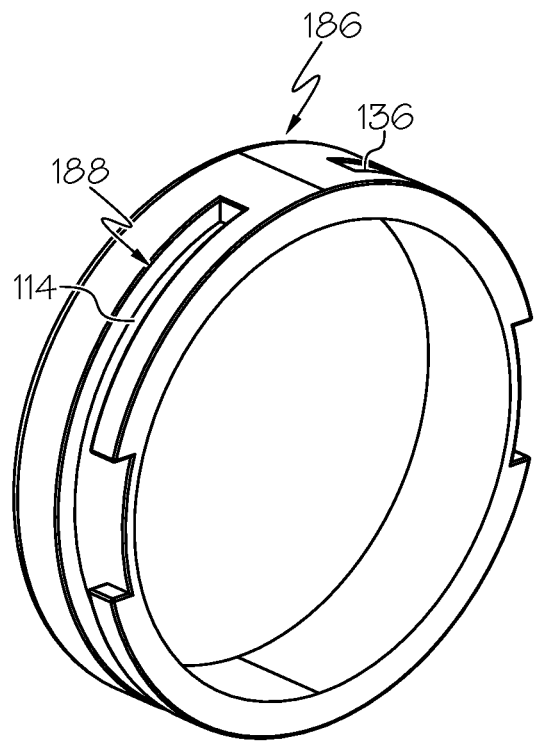
FIG. 19 is a schematic, perspective view of an example of a fitting cap.
Figure 20:
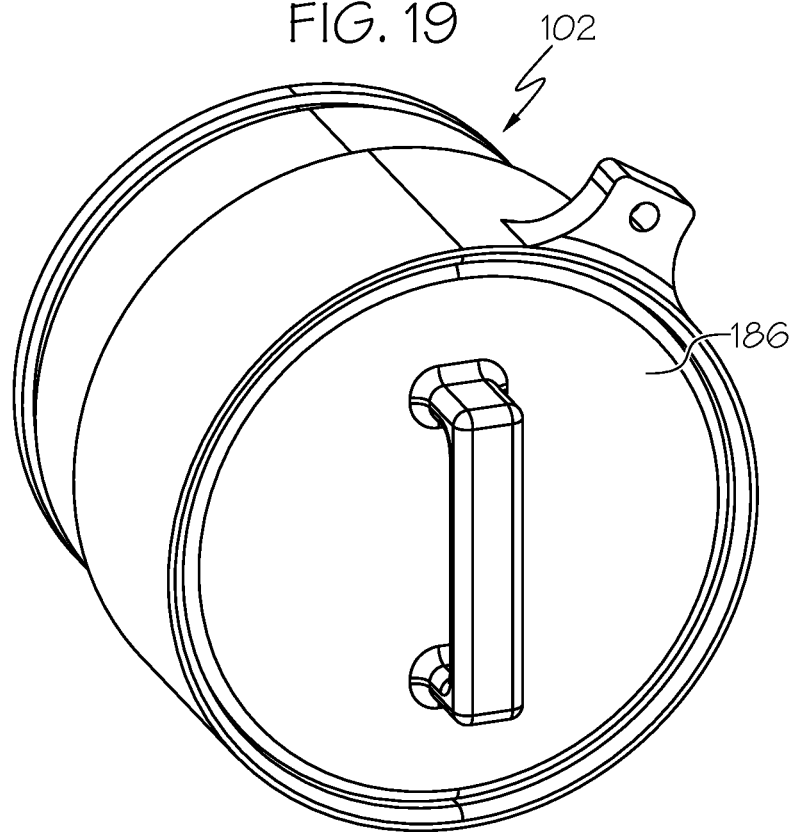
FIG. 20 is a schematic, perspective view of an example of the fitting cap coupled to the fitting.

Referring to FIGS. 1, 19 and 20, in one or more examples, the fitting 102 includes the fitting cap 186. The fitting cap 186 includes a cap twist-lock 188. The fitting twist-lock 108 is configured to engage the cap twist-lock 188 by rotating the fitting cap 186 about the connection axis 110 relative to the fitting 102.

In one or more examples, the cap twist-lock 188 of the fitting cap 186 includes a cooperating or complementary one of the twist-lock protrusion 112 or the twist-lock groove 114 and is configured to mate and engage with the fitting twist-lock 108 of the fitting 102. The twist-lock protrusion 112 is seated in the twist-lock groove 114 by applying the fitting cap 186 to the fitting second end 120 of the fitting 102. The twist-lock protrusion 112 is moved to a secured position within the twist-lock groove 114 rotating the fitting cap 186 about the connection axis 110 relative to the fitting 102.

Figure 21:
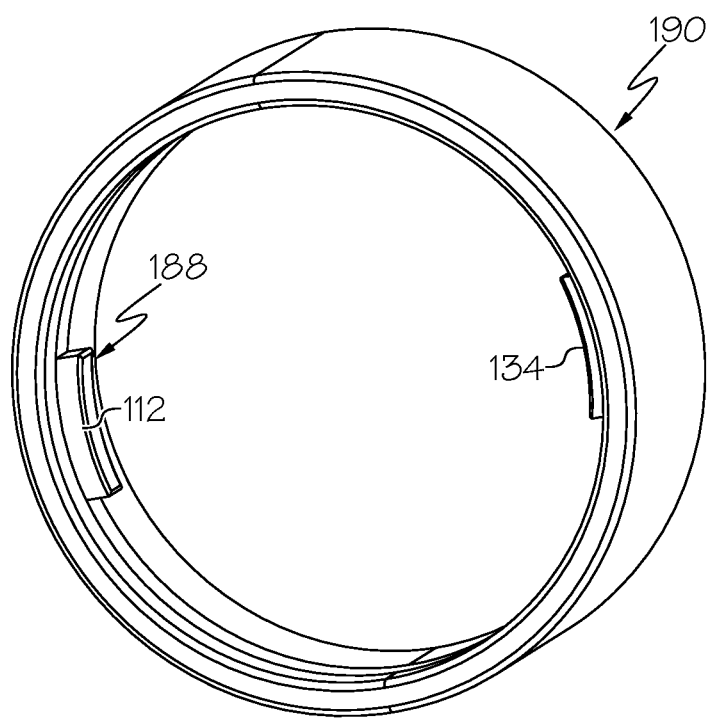
FIG. 21 is a schematic, perspective view of an example of a connector cap.
Figure 22:
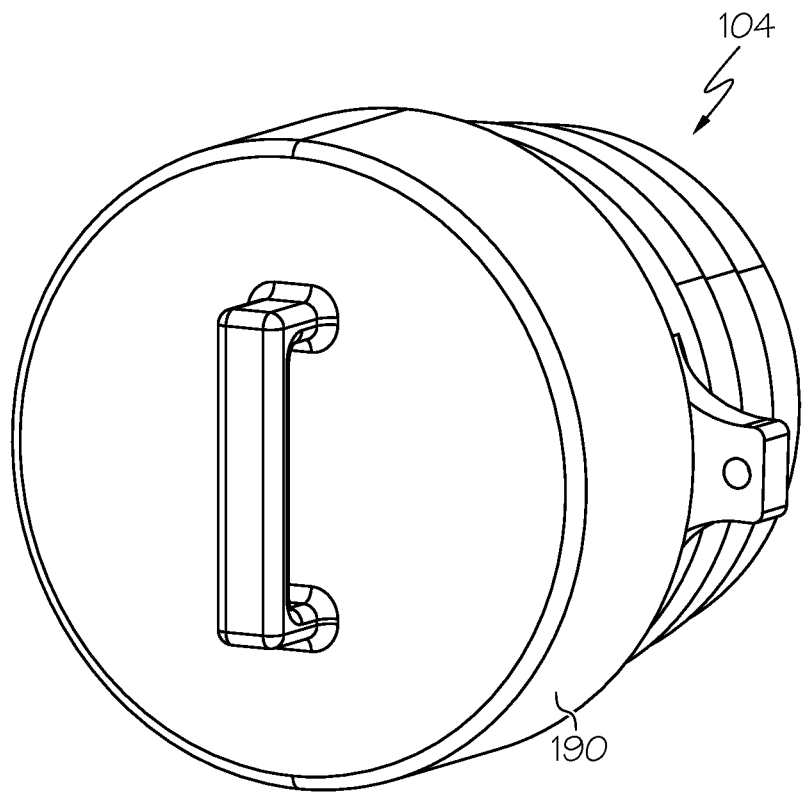
FIG. 22 is a schematic, perspective view of an example of the connector cap coupled to the connector.

Referring to FIGS. 1, 21 and 22, in one or more examples of the connection assembly 100, the connector 104 includes a connector cap 190. The connector cap 190 includes the cap twist-lock 188. The connector cap 190 is applied to the connector 104 to engage the cap twist-lock 188 and the connector twist-lock 106 together by rotating the connector cap 190 relative to the connector 104.

In one or more examples, the cap twist-lock 188 of the connector cap 190 includes a cooperating or complementary one of the twist-lock protrusion 112 or the twist-lock groove 114 and is configured to mate and engage with the connector twist-lock 106 of the connector 104. The twist-lock protrusion 112 is seated in the twist-lock groove 114 by applying the connector cap 190 to the connector first end 146 of the connector 104. The twist-lock protrusion 112 is moved to a secured position within the twist-lock groove 114 rotating the connector cap 190 relative to the connector 104.

Referring to FIGS. 1 and 6-8, in one or more examples, the connector 104 includes a handle 130. The handle 130 enables manipulation of the connector 104 during insertion of the connector 104 in the fitting 102 and rotation of the connector 104 about the connection axis 110 relative to the fitting 102 when coupling the fitting 102 and the connector 104 together. In one or more examples, the handle 130 extends from the connector body 144.

Figure 2:
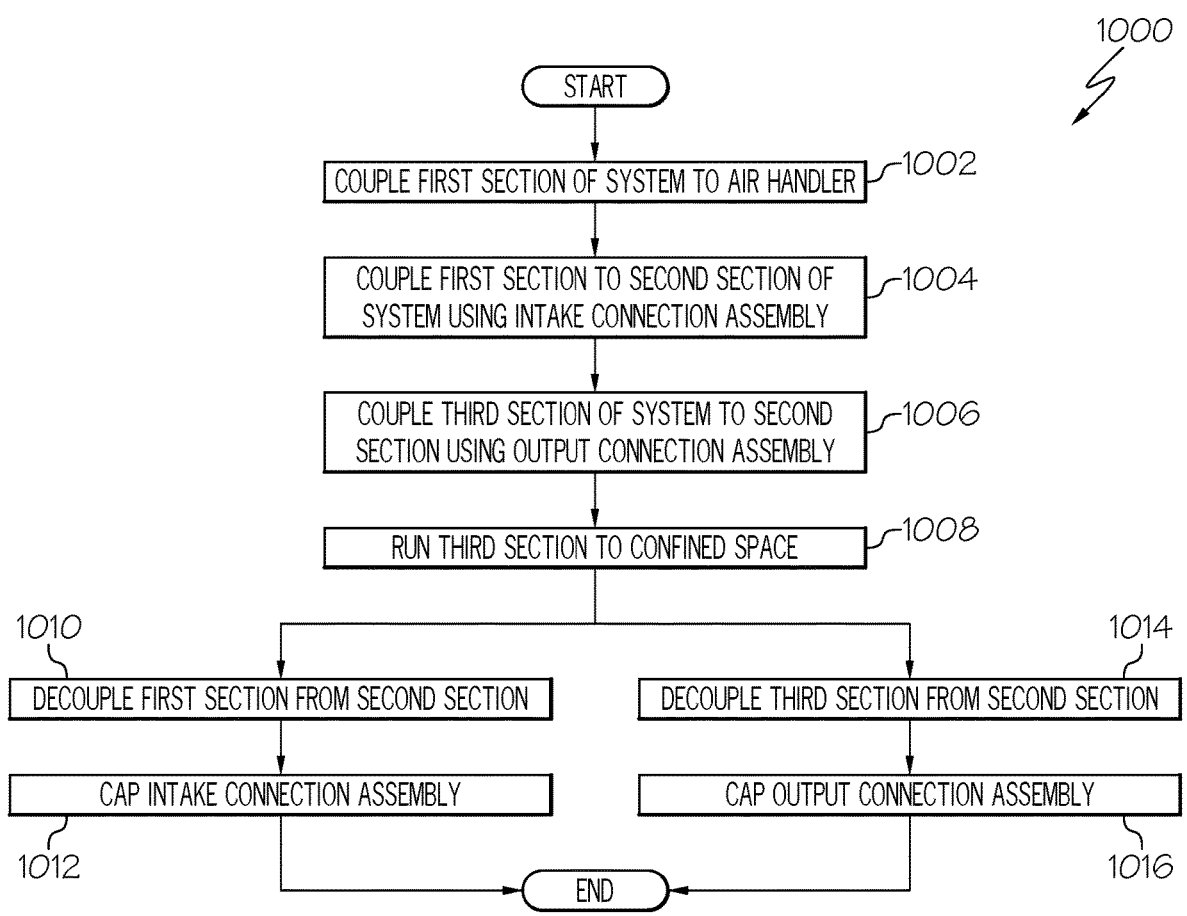
FIG. 2 is a flow diagram of an example of a method for conveying gas.

Referring now to FIG. 2, the following are examples of the method 1000, according to the present disclosure. In one or more examples, the method 1000 is implemented using the fitting 102, the connection assembly 100, and/or the system 200 (FIG. 1). The method 1000 includes a number of elements, steps, operations, or processes. Not all of the elements, steps, operations, or processes described or illustrated in one example are required in that example. Some or all of the elements, steps, operations, or processes described or illustrated in one example can be combined with other examples in various ways without the need to include other elements, steps, operations, or processes described in those other examples, even though such combination or combinations are not explicitly described or illustrated by example herein.

Referring generally to FIGS. 1 and 3-22 and particularly to FIG. 2, in one or more examples, the method 1000 includes a step of coupling 1002 the first section 216 (e.g., the intake hose 212) to the air handler 222. The method 1000 includes a step of coupling 1004 the first section 216 (e.g., the intake hose 212) to the second section 218 (e.g., the manifold 202 or the pipe 220) using the intake connection assembly 208. The method 1000 includes a step of coupling 1006 the third section 228 (e.g., the output hose 214) to the second section 218 (e.g., the manifold 202) using the output connection assembly 210. The method 1000 includes a step of running 1008 the output hose 214 to the space 280.

In one or more examples, according to the method 1000, each one of the intake connection assembly 208 and the output connection assembly 210 includes the fitting 102 and the connector 104. The fitting 102 is connected to the manifold 202 and includes the fitting cam-lock 274 and the fitting twist-lock 108. The connector 104 is connected to the intake hose 212 or the output hose 214 and includes the connector twist-lock 106. The fitting cam-lock 274 of the fitting 102 is configured to engage the manifold cam-lock 254 of the manifold 202. The fitting twist-lock 108 of the fitting 102 is configured to engage the connector twist-lock 106 of the connector 104 by rotating the connector 104 about the connection axis 110 relative to the fitting 102.

In one or more examples, the method 1000 includes a step of decoupling 1010 the first section 216 from the second section 218. In one or more examples, the method 1000 includes a step of capping 1012 the intake connection assembly 208.

In one or more examples, the method 1000 includes a step of decoupling 1014 the third section 228 from the second section 218. In one or more examples, the method 1000 includes a step of capping 1016 the output connection assembly 210.

Figure 23:
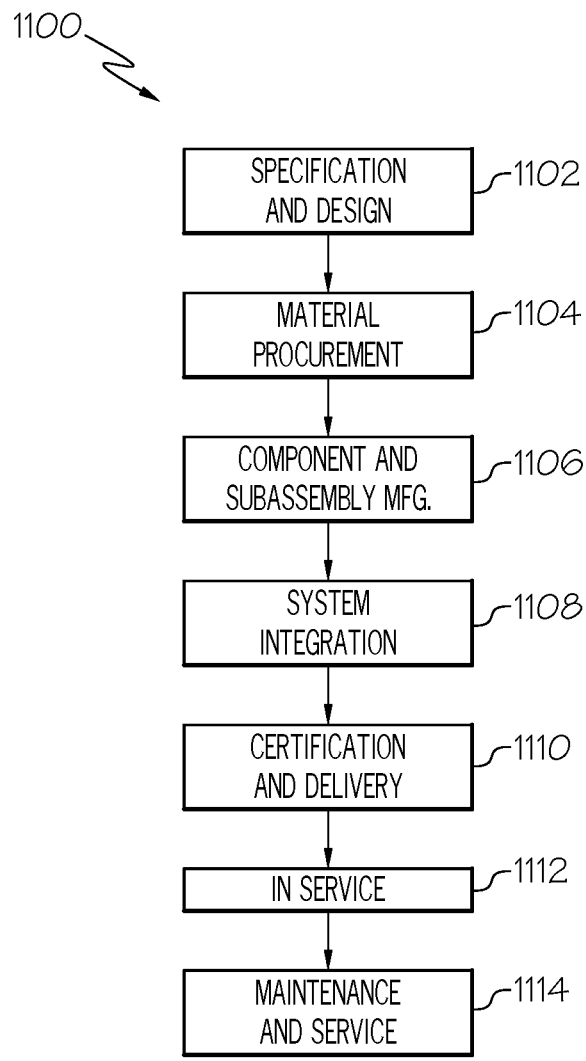
FIG. 23 is a flow diagram of an example of an aircraft manufacturing and service method.
Figure 24:
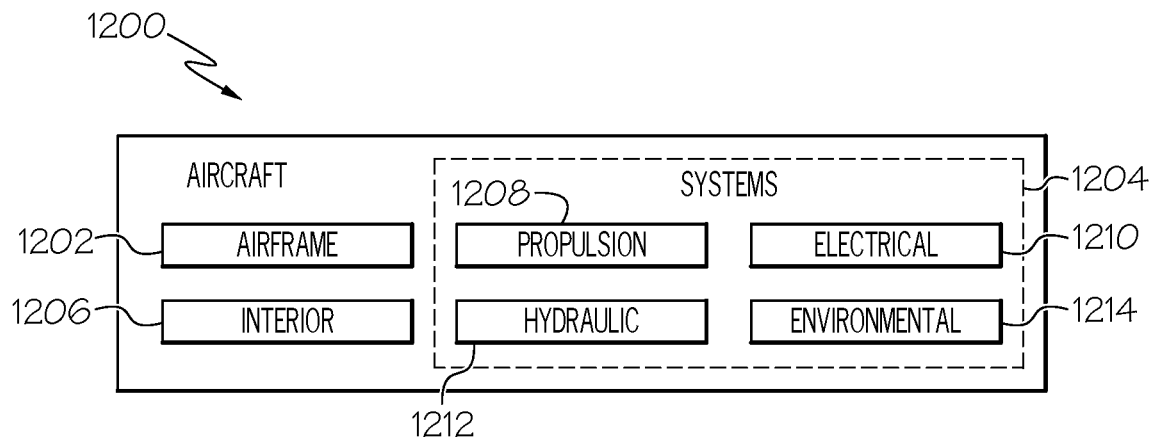
FIG. 24 is a schematic block diagram of an example of an aircraft.

Referring now to FIGS. 23 and 24, examples of the fitting 102, the connection assembly 100, the system 200, and the method 1000 described herein, may be related to, or used in the context of, the aerospace manufacturing and service method 1100, as shown in the flow diagram of FIG. 23 and an aircraft 1200, as schematically illustrated in FIG. 24. As an example, the aircraft 1200 and/or the manufacturing and service method 1100 may include or utilize the system 200 and/or the method 1000 for conveying gas, such as air, to desired spaces during manufacture or during service.

Referring to FIG. 24, which illustrates an example of the aircraft 1200. The aircraft 1200 can be any aerospace vehicle or platform. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In yet other examples, the onboard systems 1204 also include one or more other systems, such as, but not limited to, communications systems, avionics systems, software distribution systems, network communications systems, passenger information/entertainment systems, guidance systems, radar systems, weapons systems, and the like. The aircraft 1200 may include the gas conveyance system 200.

Referring to FIG. 23, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 23 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the fitting 102, the connection assembly 100, the system 200, and the method 1000, shown and described herein, may be employed during any one or more of the stages of the manufacturing and service method 1100 shown in the flow diagram illustrated by FIG. 23. In an example, gas, such as air, may be conveyed to and/or from a desired space using the system 200 coupled together using the connection assembly 100 and/or according to the method 1000 during a portion of component and subassembly manufacturing (block 1106) and/or system integration (block 1108). Further, gas, such as air, may be conveyed to and/or from a desired space using the system 200 coupled together using the connection assembly 100 and/or according to the method 1000 while the aircraft 1200 is in service (block 1112). Also, gas, such as air, may be conveyed to and/or from a desired space using the system 200 coupled together using the connection assembly 100 and/or according to the method 1000 during system integration (block 1108) and certification and delivery (block 1110). Similarly, gas, such as air, may be conveyed to and/or from a desired space using the system 200 coupled together using the connection assembly 100 and/or according to the method 1000 while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an"

should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1, 3-22 and 24, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1, 3-22 and 24, referred to above, need be included in every example and not all elements, features, and/or components described herein are necessarily depicted in each illustrative example. Accordingly, some of the elements, features, and/or components described and illustrated in FIGS. 1, 3-22 and 24 may be combined in various ways without the need to include other features described and illustrated in FIGS. 1, 3-22 and 24, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1, 3-22 and 24, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1, 3-22 and 24, and such elements, features, and/or components may not be discussed in detail herein with reference to each of FIGS. 1, 3-22 and 24. Similarly, all elements, features, and/or components may not be labeled in each of FIGS. 1, 3-22 and 24, but reference numerals associated therewith may be utilized herein for consistency.

In FIGS. 2 and 23, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 2 and 23 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the fitting 102, the connection assembly 100, the system 200, and the method 1000 have been shown and described, modifications may occur to those skilled in the art upon reading the specification. The present application includes such modifications and is limited only by the scope of the claims.

What is claimed is:

1. A fitting comprising:
   a fitting body comprising a connection axis;
   a fitting first end having a fitting first opening;
   a fitting second end having a fitting second opening;
   a fitting cam-lock proximate the fitting first end and comprising:
      a first cam-lock protrusion projecting from a fitting outer surface of the fitting body;
      a second cam-lock protrusion projecting from the fitting outer surface and spaced away from the first cam-lock protrusion along the connection axis; and
      a cam-lock groove formed between the first cam-lock protrusion and the second cam-lock protrusion;
   a first cam-lock gasket coupled to the first cam-lock protrusion;
   a second cam-lock gasket coupled to the second cam-lock protrusion;
   a fitting twist-lock proximate the fitting second end, wherein:
      the fitting cam-lock is configured to engage a manifold cam-lock of a manifold of a gas conveyance system; and
      the fitting twist-lock is configured to engage a connector twist-lock of a connector by rotating the connector about the connection axis relative to the fitting.

2. The fitting of claim 1, further comprising a flange projecting from the fitting outer surface of the fitting body between the fitting cam-lock and the fitting second end.

3. The fitting of claim 1, wherein:
   the fitting body comprises:
      a first inner dimension at the fitting first end; and
      a second inner dimension at the fitting second end; and
   the first inner dimension and the second inner dimension are the same.

4. The fitting of claim 1, wherein:
   the fitting body comprises:
      a first inner dimension at the fitting first end; and
      a second inner dimension at the fitting second end; and
   the first inner dimension and the second inner dimension are different.

5. The fitting of claim 4, wherein the second inner dimension is less that than the first inner dimension.

6. The fitting of claim 1, wherein:
   the fitting twist-lock comprises a twist-lock groove formed in a fitting inner surface of the fitting body proximate the fitting second end;
   the twist-lock groove is configured to receive a twist-lock protrusion projecting from a connector outer surface of the connector; and
   the twist-lock protrusion is moved to a secured position in the twist-lock groove by rotating the connector about the connection axis relative to the fitting.

7. The fitting of claim 6, further comprising a stop disposed along the twist-lock groove that limits rotation of the connector about the connection axis relative to the fitting.

8. The fitting of claim 6, wherein:
   the fitting twist-lock further comprises a second twist-lock groove formed in the fitting inner surface of the fitting body proximate the fitting second end;
   the twist-lock groove is configured to receive a second twist-lock protrusion projecting from the connector outer surface of the connector; and
   the second twist-lock protrusion is moved to a secured position in the second twist-lock groove by rotating the connector about the connection axis relative to the fitting.

9. The fitting of claim 8, further comprising a stop disposed between the twist-lock groove and the second twist-lock groove that limits rotation of the connector about the connection axis relative to the fitting.

10. The fitting of claim 1, wherein:
    the fitting twist-lock comprises a twist-lock protrusion projecting from a fitting inner surface proximate the fitting second end;
    the twist-lock protrusion is configured to fit in a twist-lock groove formed in a connector outer surface of the connector; and
    the twist-lock protrusion is moved to a secured position in the twist-lock groove by rotating the connector about the connection axis relative to the fitting.

11. The fitting of claim 10, wherein:
    the fitting twist-lock comprises a second twist-lock protrusion projecting from the fitting inner surface proximate the fitting second end;
    the second twist-lock protrusion is configured to fit in a second twist-lock groove formed in the connector outer surface of the connector; and
    the second twist-lock protrusion is moved to a secured position in the second twist-lock groove by rotating the connector about the connection axis relative to the fitting.

12. The fitting of claim 1, further comprising a fitting lug projecting from the fitting outer surface of the fitting body, wherein the fitting lug is configured to connect to a connector lug projecting from a connector outer surface of the connector.

13. The fitting of claim 1, further comprising a fitting gasket located on a fitting inner surface of the fitting body proximate the fitting second end.

14. The fitting of claim 1, further comprising a fitting cap, wherein:
   the fitting cap comprises a cap twist-lock; and
   the fitting twist-lock is configured to engage the cap twist-lock by rotating the fitting cap about the connection axis relative to the fitting.

15. The fitting of claim 1, wherein the cam-lock groove is annular.

16. A connection assembly for coupling a hose and a manifold of a gas conveyance system, the connection assembly comprising:
   a fitting configured connect to the manifold and comprising a fitting body, a fitting cam-lock, and a fitting twist-lock; and
   a connector configured to connect to the hose and comprising a connector twist-lock,
   wherein:
      the fitting cam-lock of the fitting is configured to engage a manifold cam-lock of the manifold and comprises:
         a first cam-lock protrusion projecting from a fitting outer surface of the fitting body;
         a second cam-lock protrusion projecting from the fitting outer surface and spaced away from the first cam-lock protrusion along a connection axis; and
         a cam-lock groove formed between the first cam-lock protrusion and the second cam-lock protrusion;
         a first cam-lock gasket coupled to the first cam-lock protrusion; and
         a second cam-lock gasket coupled to the second cam-lock protrusion; and
      the fitting twist-lock of the fitting is configured to engage the connector twist-lock of the connector by rotating the connector about a connection axis relative to the fitting.

17. The connection assembly of claim 16, wherein:
   the fitting further comprises:
      a fitting first end having a fitting first opening; and
      a fitting second end having a fitting second opening;
   the connector comprises:
      a connector body;
      a connector first end having a connector first opening; and
      a connector second end having a connector second opening;
   the fitting cam-lock is located proximate the fitting first end;
   the fitting twist-lock is located proximate the fitting second end; and
   the connector twist-lock is located proximate the connector first end.

18. The connection assembly of claim 17, wherein the fitting further comprises a flange projecting from a fitting outer surface of the fitting body between the fitting cam-lock and the fitting second end.

19. The connection assembly of claim 16, wherein the cam-lock groove is annular.

20. A method for conveying a gas, the method comprising:
   coupling an intake hose to an air handler;
   coupling the intake hose to a manifold using an intake connection assembly;
   coupling an output hose to the manifold using an output connection assembly; and
   running the output hose to a confined space,
   wherein:
      each one of the intake connection assembly and the output connection assembly comprises:
         a fitting connected to the manifold and comprising a fitting cam-lock and a fitting twist-lock; and
         a connector connected to the intake hose or the output hose and comprising a connector twist-lock,
      the fitting cam-lock of the fitting is configured to engage a manifold cam-lock of the manifold and comprises:
         a first cam-lock protrusion projecting from a fitting outer surface of a fitting body;
         a second cam-lock protrusion projecting from the fitting outer surface and spaced away from the first cam-lock protrusion along a connection axis; and
         a cam-lock groove formed between the first cam-lock protrusion and the second cam-lock protrusion;
         a first cam-lock gasket coupled to the first cam-lock protrusion;
         a second cam-lock gasket coupled to the second cam-lock protrusion; and
      the fitting twist-lock of the fitting is configured to engage the connector twist-lock of the connector by rotating the connector about the connection axis relative to the fitting.

* * * * *